United States Patent [19]

Richardson

[11] 4,453,258

[45] Jun. 5, 1984

[54] AUTOMATIC GAIN CONTROL CIRCUIT

[75] Inventor: Donald C. Richardson, Houston, Tex.

[73] Assignee: Texas Instruments Incorporated, Dallas, Tex.

[21] Appl. No.: 268,513

[22] Filed: Jun. 2, 1981

[51] Int. Cl.³ .......................................... H03H 17/00
[52] U.S. Cl. .................................. 375/98; 333/17 R; 333/173; 381/107
[58] Field of Search .................... 179/1 VL, 1 VC; 307/493, 264, 540, 543, 552, 553; 333/17 R, 333/81 R, 167, 168, 174, 173; 323/304, 352; 364/582; 375/98; 455/249; 330/141, 135, 281, 284; 381/104, 107, 108, 110

[56] References Cited

U.S. PATENT DOCUMENTS

| | | | |
|---|---|---|---|
| 3,281,687 | 10/1966 | Boer et al. | 364/582 |
| 3,753,159 | 8/1973 | Burwen | 333/17 |
| 3,794,941 | 2/1974 | Templin | 333/17 |
| 4,112,384 | 9/1978 | Buchberger | 179/1 VC |
| 4,161,628 | 7/1979 | McRae | 375/98 |
| 4,300,108 | 11/1981 | Shack et al. | 333/81 R |
| 4,366,456 | 12/1982 | Ueno et al. | 333/173 |

OTHER PUBLICATIONS

The Radio and Electronic Engineer, vol. 47, No. 10, pp. 465-469, Oct. 1977. "Automatic Input Attenuator for H.F. Communication Receivers".

Primary Examiner—Benedict V. Safourek
Attorney, Agent, or Firm—Thomas G. Devine; Leo N. Heiting; Melvin Sharp

[57] ABSTRACT

An integrated circuit automatic gain control circuit maintains an alternating input signal at a predetermined amplitude. A ladder network of capacitors and accompanying FET switches provides for varying the gain of an integrated switched capacitor filter. The output signal from the filter is compared in a comparison circuit, the comparison circuit providing an UP signal if the output signal is too small or a DOWN signal if the output signal is too large. The UP and DOWN signal is applied to a ROM which causes a counter to count up or down in response to the UP or DOWN input signal, the counter inputting the ROM to provide control signals from the ROM for controlling the switches of the capacitor ladder network.

9 Claims, 19 Drawing Figures

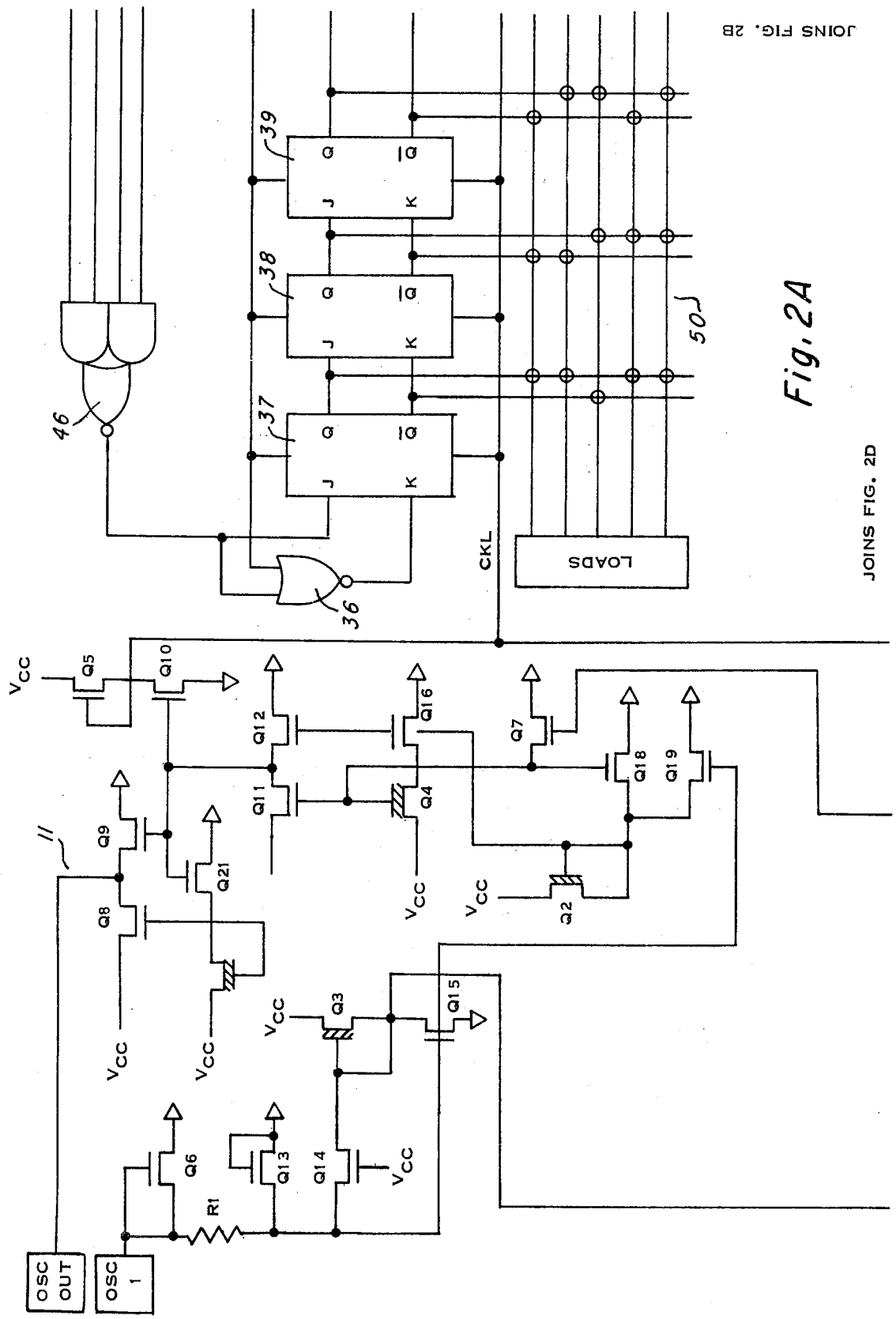

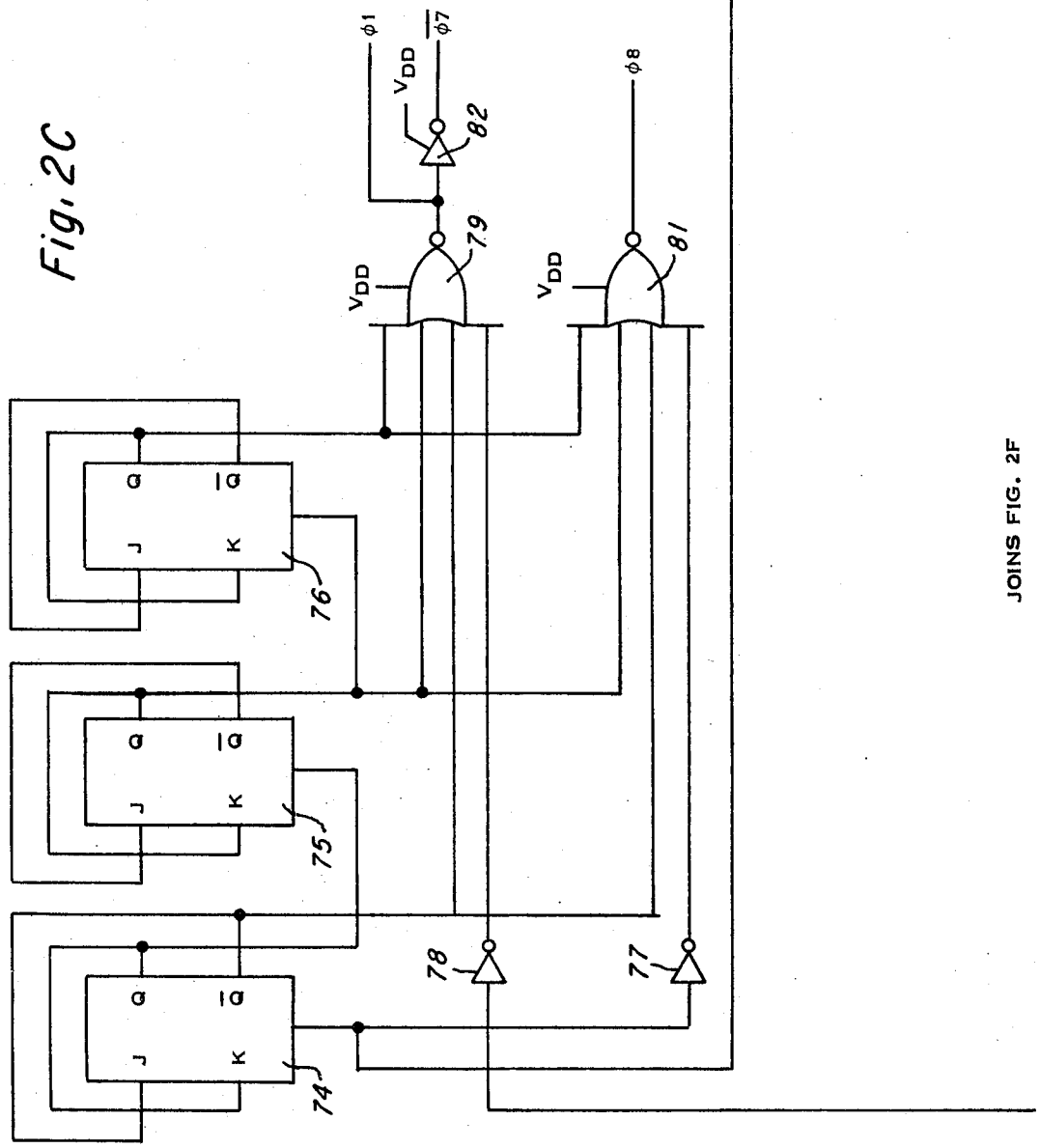

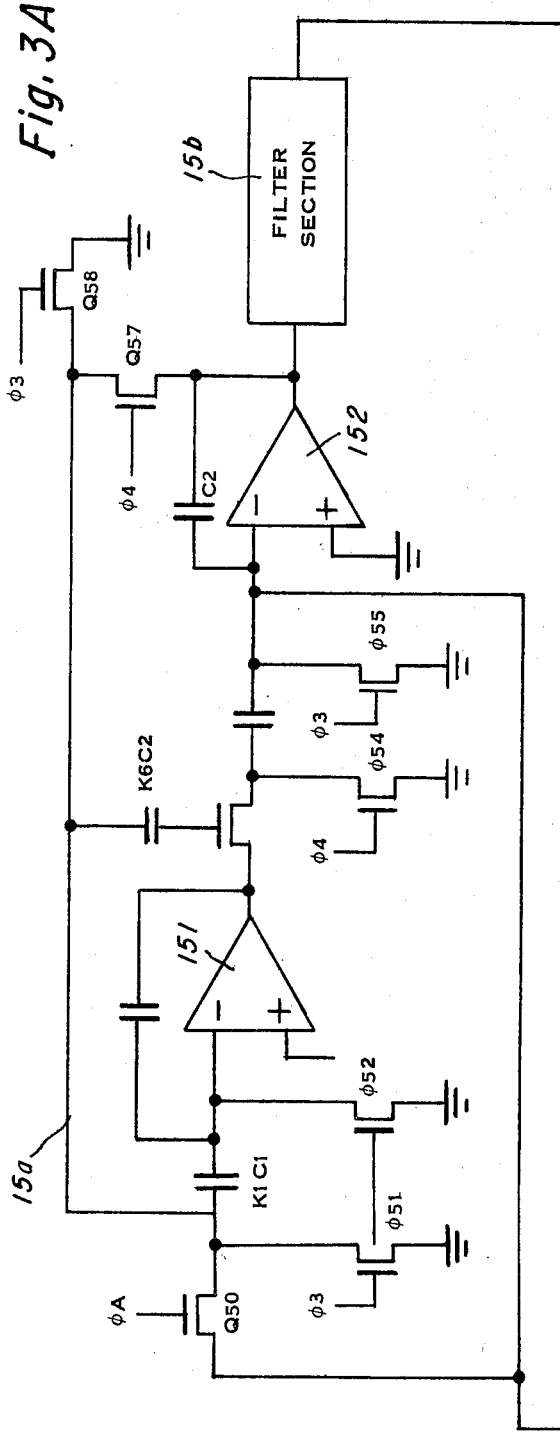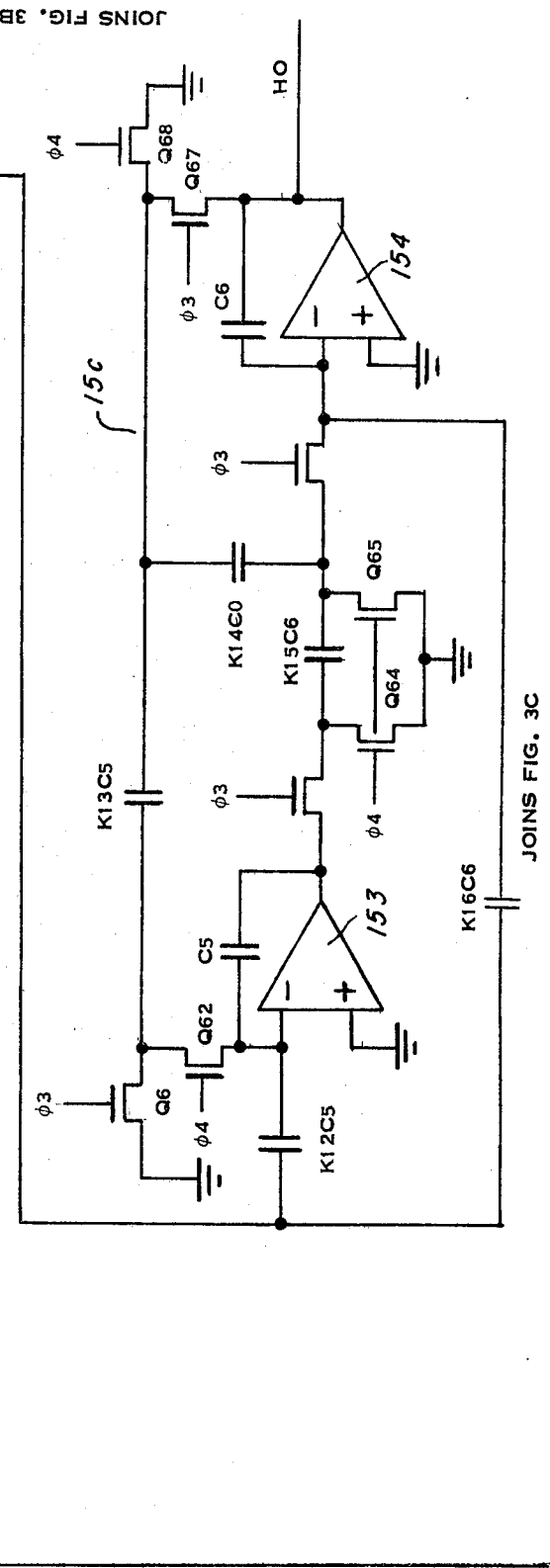

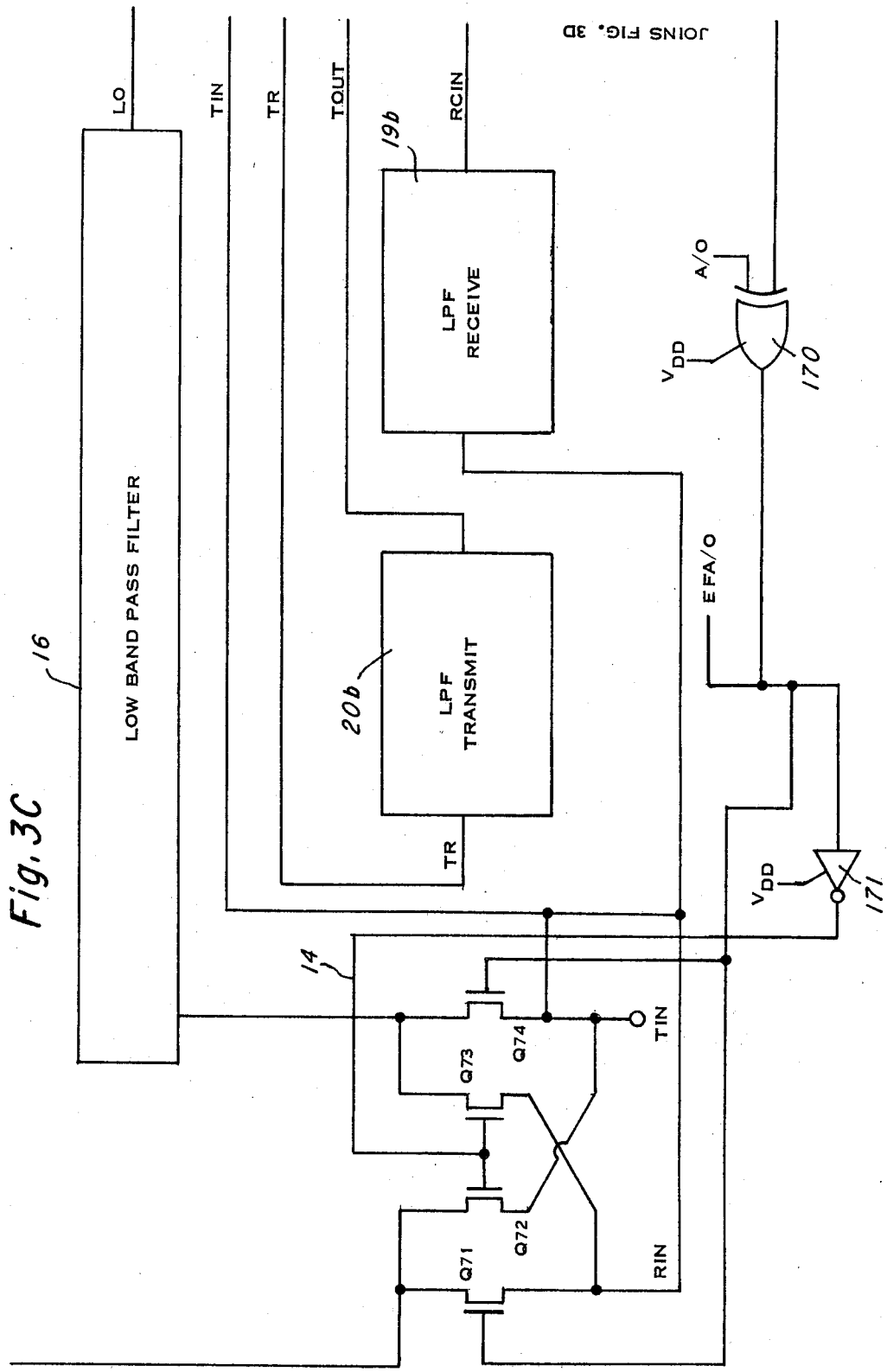

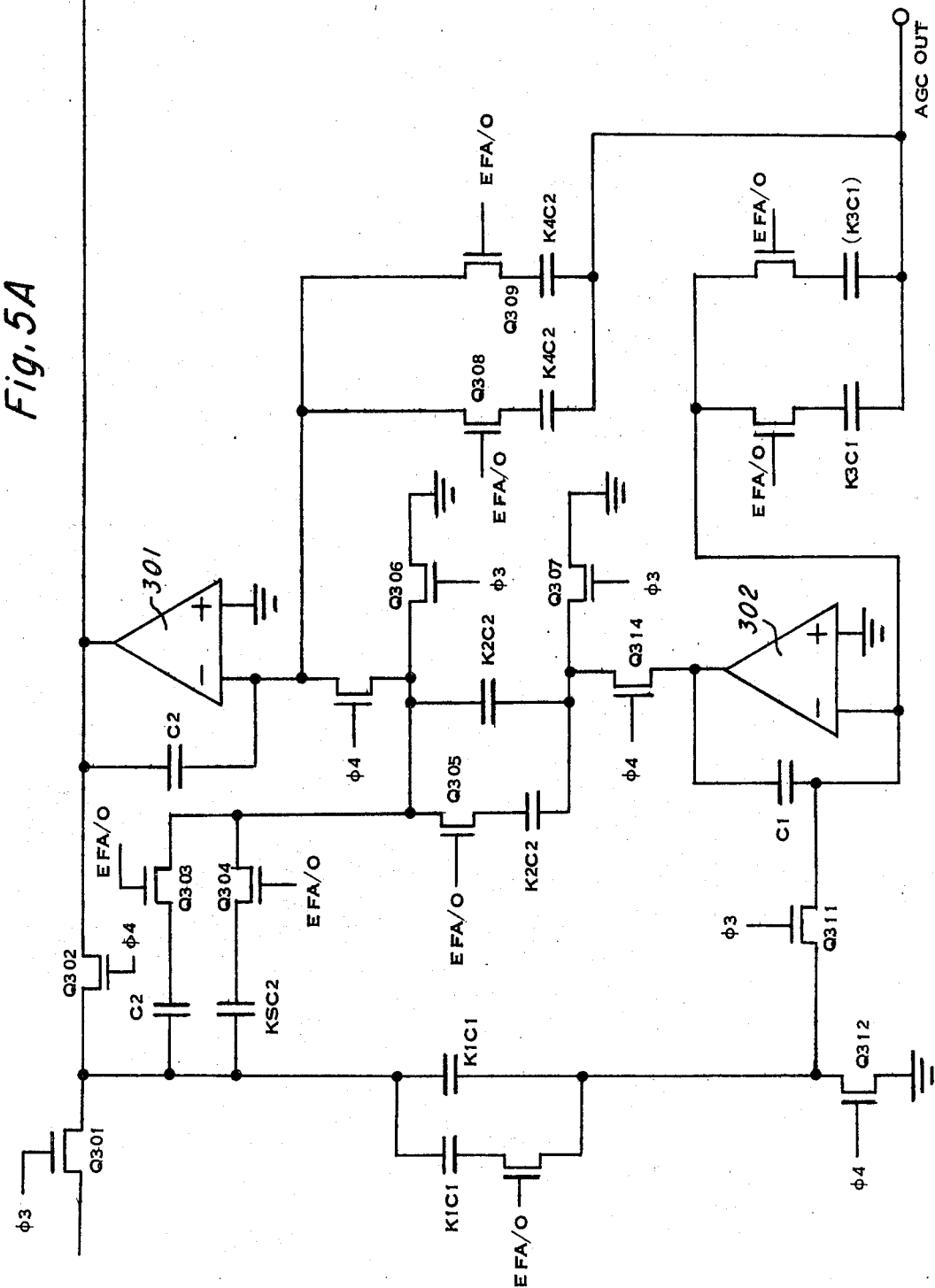

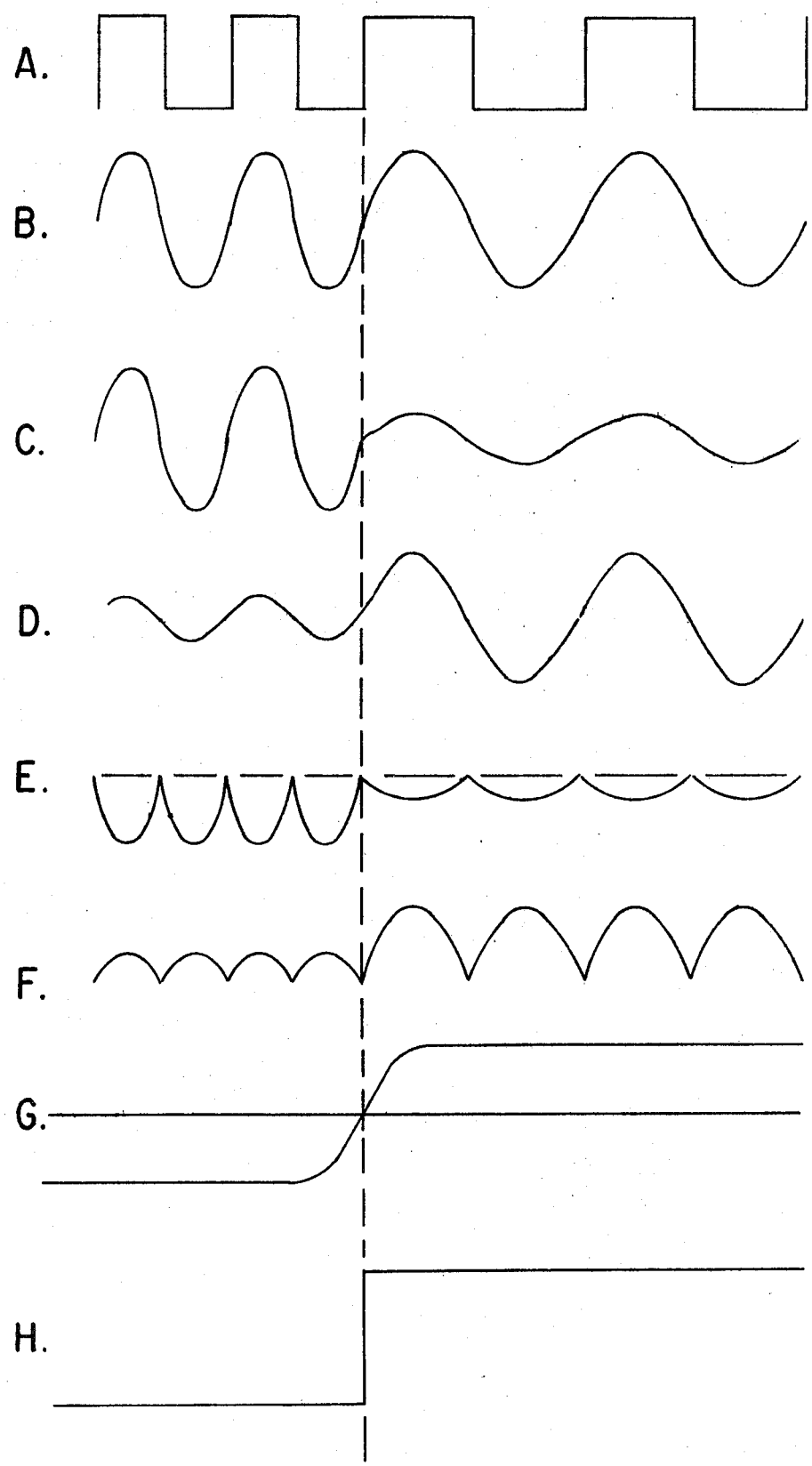

AUTOMATIC GAIN CONTROL CIRCUIT

BACKGROUND OF THE INVENTION

Field of the Invention

This invention relates to automatic gain control circuits and in particular to integrated circuit automatic gain control circuits used in a single chip FSK MODEM employing switched capacitor technology.

Automatic gain control circuits are well known in the prior art. They have been made up of vacuum tubes and discrete transistors. They also have been made of integrated, bipolar transistor circuits.

This invention employs a switched capacitor filter and field effect transistors, specifically metal oxide silicon field effect transistors (MOSFET). This implementation permits single chip integration in the MODEM system enabling proper implementation and functioning of the MODEM.

BRIEF SUMMARY OF THE INVENTION

A frequency shift keying (FSK) signal is received by a capacitor ladder network comprising a series of capacitors with accompanying FET switches wherein the FET switches are controlled to switch the accompanying capacitors in and out of the circuit, as required. The capacitor ladder network is incorporated in a switched capacitor bandpass filter whose output signal is compared, in a comparison circuit, with a first voltage reference to determine if the signal is large enough, and if it is, with a second voltage reference signal to determine whether it is too large. A pair of latch circuits respond to the comparison circuit, one providing an UP signal if the output signal is too small and the other providing a DOWN signal if the output signal is too large. The UP and DOWN signal is applied to a ROM which provides appropriate signals to an up-down counter to cause the counter to count up or down, depending upon the status of the UP and DOWN signals. The output of the up-down counter provides inputs to the ROM for generating control signals which are applied to the gates of the FETs in the ladder network for switching capacitors in or out to cause the gain of the filter to increase or decrease.

The main object of this invention is to provide a wholly integrated circuit automatic gain control circuit.

A second object of this invention is to provide an automatic gain control circuit incorporating a switched capacitor filter.

These and other objects will be made evident in the detailed description that follows.

BRIEF DESCRIPTION OF THE DRAWINGS

FIGS. 2A-2F form a schematic diagram of the square wave generator and the circuitry for providing timing pulses.

FIGS. 3A-3D form a schematic diagram illustrating the high and low band pass filters, the input and output multiplexers and the low pass input and output filters.

FIG. 5A is a schematic diagram of the mark and space filters.

FIG. 7 illustrates wave shapes at various points within the modem.

DETAILED DESCRIPTION

Figure 1:
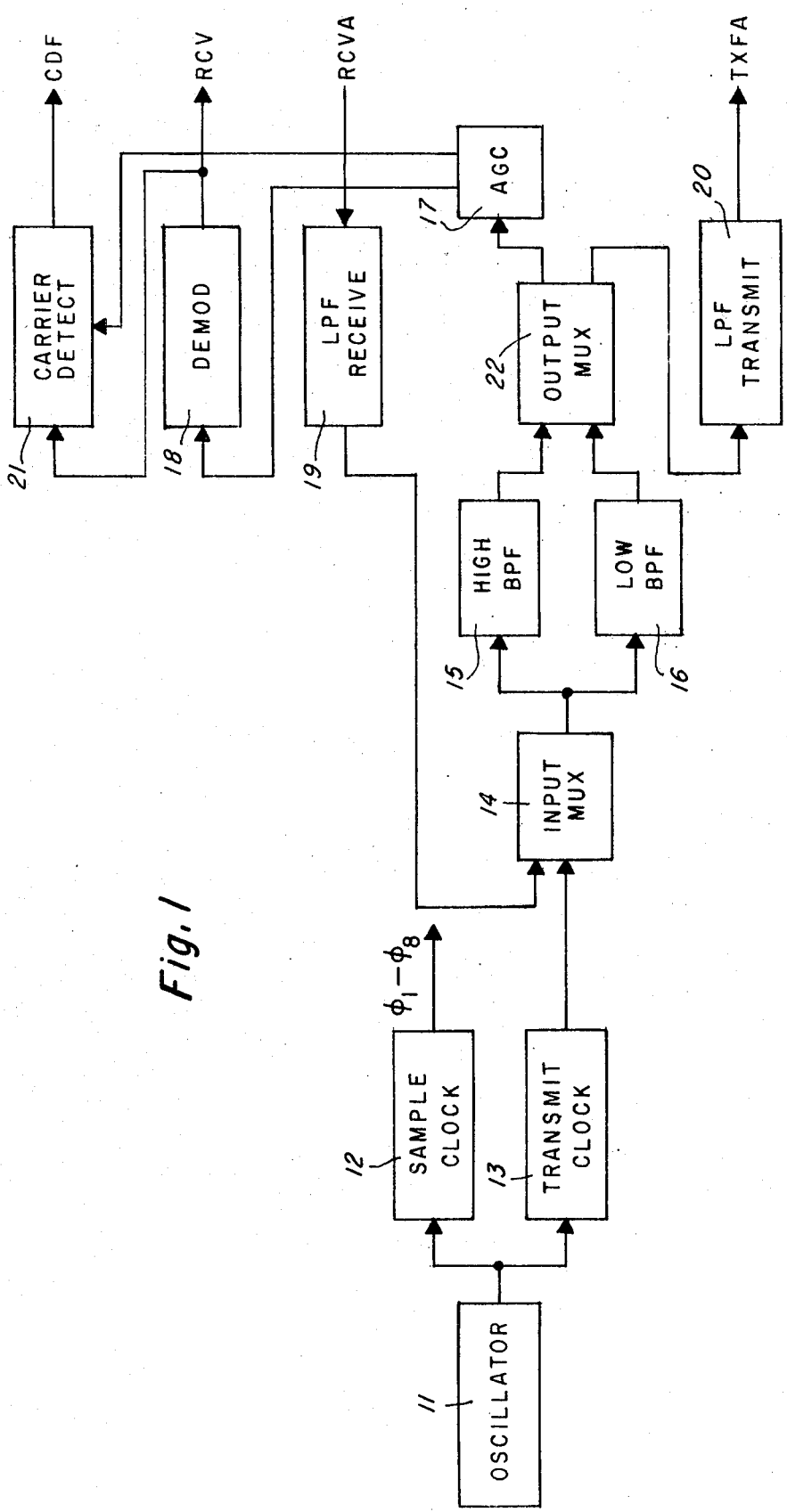
FIG. 1 is a block diagram of the FSK modem of this invention.

FIG. 1 illustrates the FSK modem of this invention in block form. Oscillator 11, whose frequency is controlled by an off-chip crystal, provides a 4.032 MHz signal to sample clock 12 and transmit clock 13. Sample clock 12 provides eight timing signals, phase 1 through phase 8. Transmit clock provides a sine wave at a desired frequency to input multiplexer 14. Input multiplexer 14 provides an input to high band pass filter 15 and low band pass filter 16. The filter that is selected depends upon the frequency band used. For example, in this preferred embodiment, a first band frequency includes a space frequency of 1270 hertz and a mark frequency of 1070 hertz, and a second band frequency containing a space frequency of 2225 hertz and a mark frequency of 2025 hertz. Any pair of frequencies is, of course, attainable.

The outputs of band pass filters 15 and 16 go to the output multiplexer 22 which is one output providing an input to automatic gain control (AGC) 17 and another to low pass filter transmit 20 which provides the output FSK signal generated from transmit clock 13 and identified as "TXFA".

The input FSK signal identified as "RCVA" is input to low pass filter receive 19, whose output provides an input to the input multiplexer 14. Thus the receive signal is filtered through LPF receive 19 and then passes through the high band pass filter 15 or low band pass filter 16, depending upon the particular frequency band as explained previously with respect to the generated signal. The received signal, after having been appropriately filtered passes through the output multiplexer 22 into automatic gain control 17. AGC 17 adjusts the input sine wave to a prescribed level and provides an input to demodulator 18. Also, a control signal is provided to carrier detect 21. Demodulator 18 detects the frequency of the particular signal and converts it to digital data, either a space "0" or a mark "1" providing output signal "RCV". Demodulator 18 provides an input to carrier detect 21 which detects the absence or presence of a carrier signal as indicated by signal "CDF".

Figure 2B:
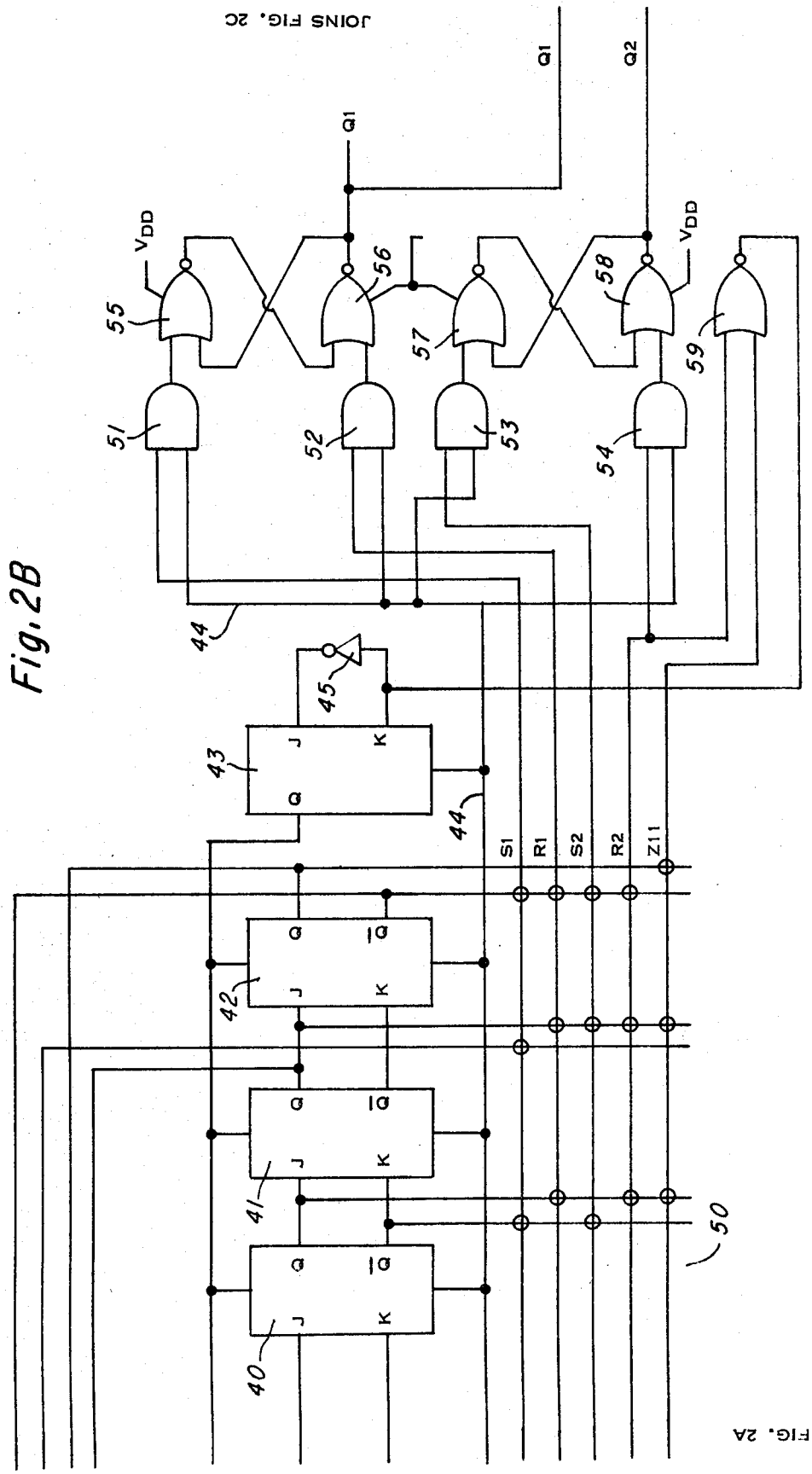
Figure 2D:
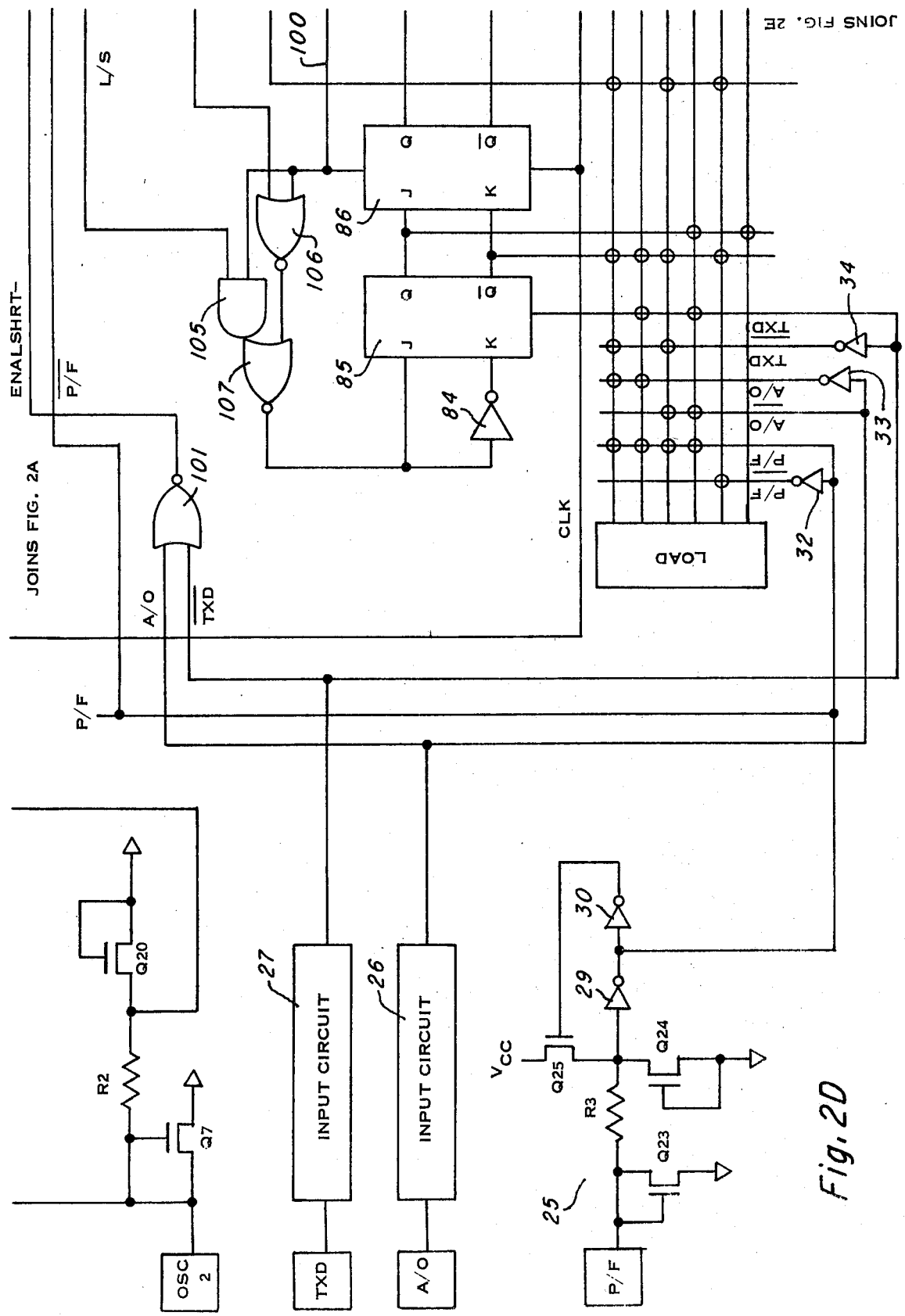

The schematic details of oscillator 11, sample clock 12, and transmit clock 13 are set out in FIGS. 2A-2F, assembled as indicated on the individual sheets. FIGS. 2A and 2D illustrate the system oscillator which is comprised of FET transistors Q1 through Q21, in a well-known configuration, with input terminals "OSC 1" and "OSC 2" receiving an input frequency of 4.032 MHz from an external crystal (not shown), and providing an oscillator output on terminal "OSC OUT".

The output from oscillator circuit 11 is the "CLK" signal derived from the connection between electrodes of transistors Q5 and Q10. It should be noted that FET transistors are controlled by gate electrodes, and have drain and source electrodes which are symmetrical. When connections are described in this application, it is understood that, because of the identity there will be no effort at identifying drain and sources as such. The drain and sources will be referred to as main electrodes. Further, the implementation of this invention is in Metal Oxide Semiconductor (MOS) type field effect transistors (MOSFET). This implementation is, of course, an engineering selection that enables the ready implementation of switched capacitor technology for the analog functions.

The "CLK" signal from oscillator 11 is applied to the clear input of flip flops 37–43. The Q output of each of flip flops 37–42 is connected to the J input of the succeeding flip flop. The Q— output of each of flip flops 37–42 is connected to the K input of each of the succeeding flip flops. The designation "—" indicates the inverse of a function. For example, if the output at Q=0, then the output at Q—=1. To further describe the connection, the Q output of flip flop 37 is connected to the J input of flip flop 38 and the Q— output of flip flop 37 is connected to the K input of flip flop 38. The Q output of flip flop 38 is connected to the J input of flip flop 39 and the Q— output of flip flop 38 is connected to the k input of flip flop 39, and so on. Associated with and connected to the Q and Q output of flip flops 37–42 is ROM 50 to provide signals S1, R1, S2, R2 and ZII. Exclusive OR circuit 46 receives the Q and Qoutputs from each of flip flops 41 and 42 and provides an input to the J input of flip flop 37. The output of Exclusive OR circuit 46 also provides one input to NOR circuit 36. The other input is provided by the Q output from flip flop 43, also providing the preset inputs to all the flip flops 37–42. This circuitry forms a pseudo-random shift register, well-known in the prior art.

The S1 output from ROM 50 provides one input to AND gate 51. Signal output R1 provides one input to AND gate 52. Output S2 provides one input to AND gate 53. Output R2 provides one input to AND gate 54 and to NOR gate 59. The CLK output on line 34 provides inputs to AND gates 51, 52, 53 and 54. The outputs from AND gates 51 and 52 provide inputs to NOR gates 55 and 56 respectively, whose outputs provide the inputs to each other, forming a latch circuit. The output from NOR gate 56 is sample clock phase 1. Similarly, gates 53 and 54 provide inputs to NOR gates 57 and 58 which are interconnected as a latch with NOR gate 58 providing sample clock phase 2. NOR gate 59 has an output connected to the K input of flip flop 43 and, through inverter 45 to the J input of flip flop 43. Thus it is shown that the sample clock 12 provides outputs phase 1 and phase 2 in a well-known manner, derived from the input CLK from oscillator 11.

Figure 2E:
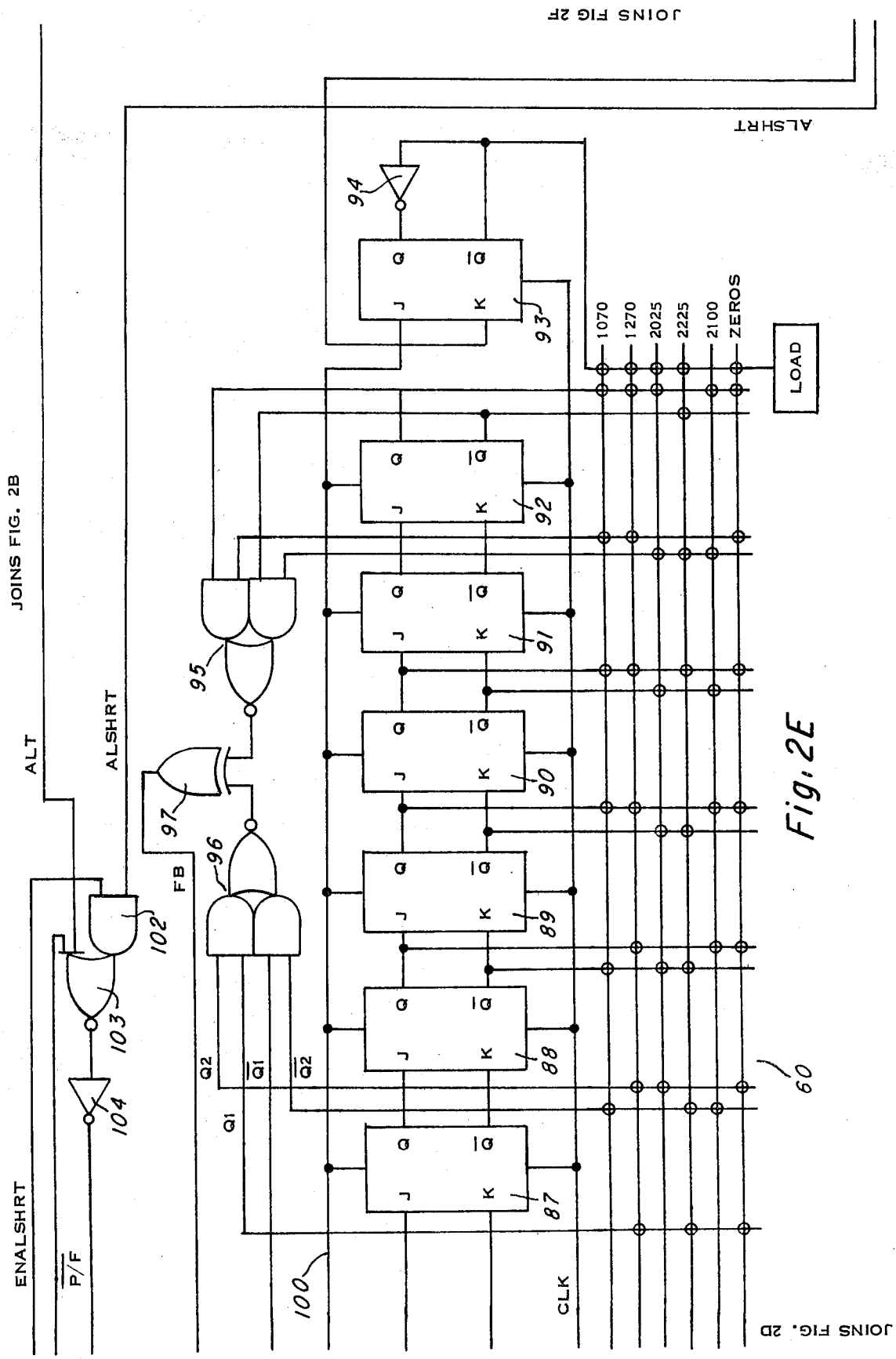
Figure 2F:
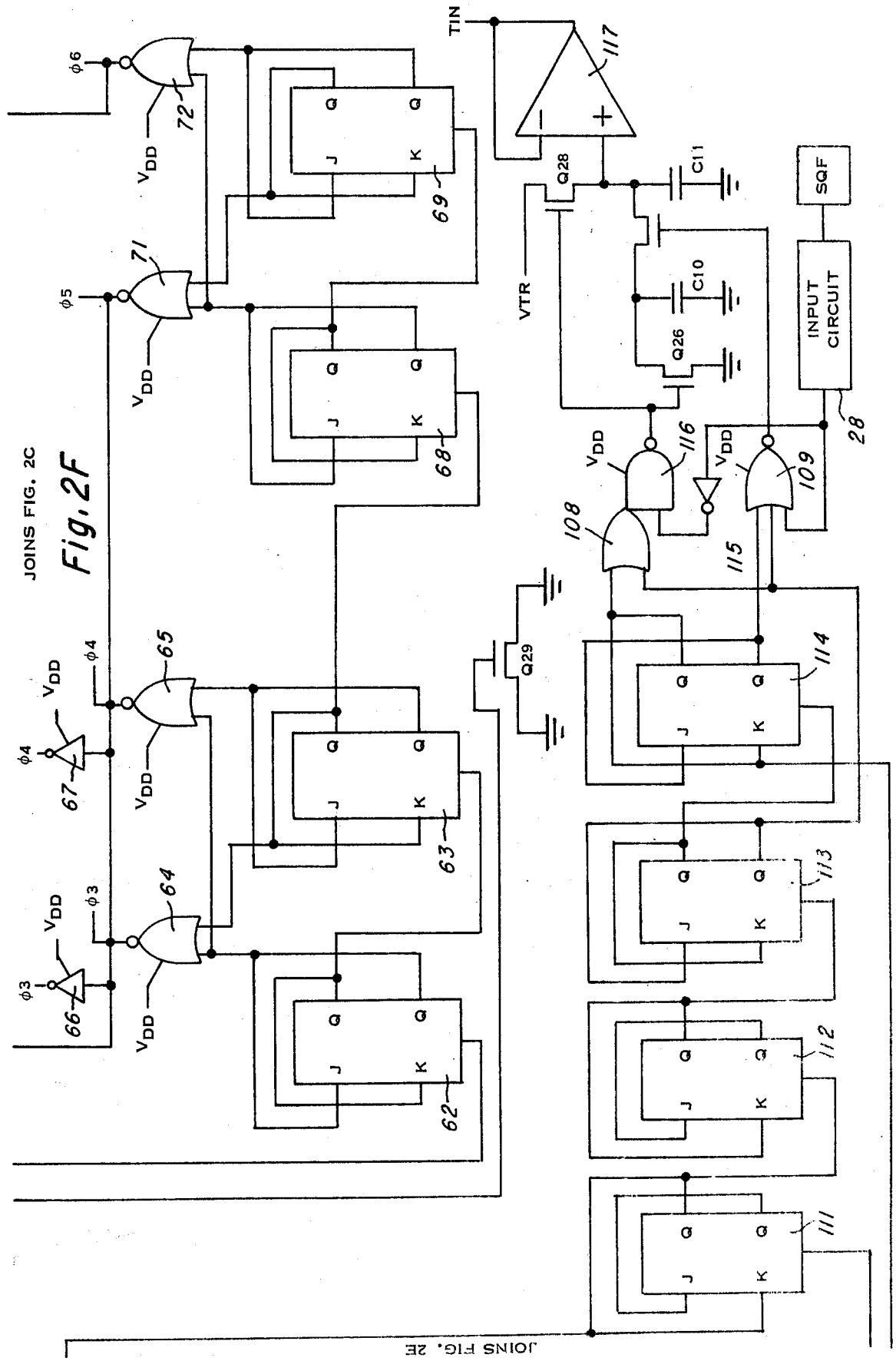

Output pulse phase 1 is connected to the clear input of flip flop 62 (FIG. 2F). The Q output of flip flop 62 provides the clear input for flip flop 63 and also the J input to flip flop 62 itself. The Q— output of flip flop 62 provides the J input to flip flop 62 and also one input to NOR gate 64. The other input to NOR gate 64 is provided by the Q output from flip flop 63 which also provides the K input to flip flop 63. The Q— output of flip flop 63 is connected to its K input and to one input of NOR gate 65 whose other input is provided by the Q— output of flip flop 62. The output of NOR gate 64 provides sample clock signal phase 3 and the output of nor gate 65 provides sample clock output signal phase 4.

Flip flops 68 and 69, together with NOR gates 71 and 72, with the clear input to flip flop 68 provided by the Q output from flip flop 63, are interconnected identically as described with respect to flip flops 62 and 63 and provide, at the outputs of nor gates 71 and 72 respectively, sample clocks signals phase 5 and phase 6.

Signal phase 3 is inverted through inverter 66 to provide signal phase 3—. Signal phase 4 is inverted through inverter 67 to provide signal phase 4—.

Signal phase 5 is inverted through inverter 78 (FIG. 2C) and provides an input to NOR gate 79. Signal phase 6 is connected to the clear input of flip flop 74 (FIG. 2B) and is inverted through inverter 77 to provide an input to NOR gate 81. The Q output of flip flop 74 is connected to the K input of flip flop 74 and to the clear input of flip flop 75. The Q— output of flip flop 74 is connected to the J input of flip flop 74 and provides another input to NOR gate 81.

The Q output of flip flop 75 provides the K input to flip flop 75, the clear input to flip flop 76 and another input to NOR gate 71. The Q— output of flip flop 75 provides the J input to flip flop 75.

The Q output of flip flop 76 provides the K input to flip flop 76 and one input to NOR gate 79 and one input to NOR gate 81. The Q— output from flip flop 76 is connected to the J input of flip flop 76.

The output of NOR gate 79 provides sample clock signal phase 7 and inverted through inverter 82, provides sample clock signal phase 7—. The output from NOR gate 81 provides sample clock signal phase 8.

These sample clock signals, derived in a conventional manner from the circuitry described above, provide the various clocking signals throughout the modem to be described.

Flip flops 85 through 93 (FIG. 2D, FIG. 2E) form a second pseudo-random shift register, interconnected in the same manner as the pseudo-random shift register associated with the sample clock 12, described above. The CLK output from oscillator 11 provides a clear input to each of flip flops 85 through 93. The preset input of flip flops 86 through 92 is provided by the Q output of flip flop 93.

Associated with the pseudo-random shift register of the transmit clock 13 is ROM 60. External select signals cause ROM 6 to provide certain inputs to the pseudo-random shift register, and associated circuitry, to provide square wave outputs of different frequencies. Those inputs are provided through input circuits such as circuit 25 which is shown in detail. As shown, input P/F is connected to the gate and to one main electrode of MOS transistor Q23 whose other main electrode is grounded. P/F is further connected, through resistor R3 to the main electrodes of transistors Q25 and Q24 and inverted through inverter 29. The other main electrode of transistor 225 is connected to reference voltage $V_{CC}$. The other main electrode of transistor Q24 is grounded. The gate of transistor Q24 is also grounded. The output of inverter 29 is further inverted through inverter 30 and provides the gate input to transistor Q25. This is a typical input circuit and is precisely duplicated in input circuits 26, 27 and 28 shown in block form. ROM 60, associated with the transmit clock pseudo-random shift register is illustrated with six rows labeled "1070", "1270", "2025", "2225", "2100" and "ZEROS". These various lines are selected for transmitting any of the desired frequencies. Of course, other frequencies could also be developed as well. The inputs from input circuits 25, 26 and 27 are P/F, or P/F—; A/O or A/O—; TXD or TXD—. The P/F signal designates whether a frequency shift keying (FSK) mode is to be selected. If it is, then the line designated 2100 is brought low thereby eliminating that frequency which is used in a phase shift keying (PSK) application which is not part of this invention nor described herein. A/O is determinative of whether the signal is an answer or an originate signal. If it is an answer, then frequencies 2025 and 2225 are eliminated by those lines being brought low. Finally, if signal TXD, indicating whether a transmit mark or space is selected, is true, then the 1070 line is also brought low so that only the 1270 line remains high, indicating a selection of 1270 hertz, or a space indication within the lower frequency band.

The logic associated with the transmit clock pseudorandom shift register includes Exclusive OR circuit 95 for exclusively ORING the outputs of flip flops 91 and 92. Exclusive OR circuit 96 exclusively OR the outputs of flip flops 86 and 87. The Exclusive OR circuit 97 provides an exclusive OR function on the outputs of circuits 95 and 96, providing signal FB as an output which provides one input to NOR gate 106 whose other input is provided by the Q output of flip flop 93, which also provides an input to AND gate 105.

Flip flops 111–114 are connected to form a divide by 16 counter. The input to this counter is supplied by the Q— output of flip flop 93 which is connected to the clear input of flip flop 111. The Q output of flip flop 111 is connected to the clear input of flip flop 112, to the K input of flip flop 111 and also provides signal ALT which supplies one input to NOR gate 103. The Q— output of flip flop 111 provides the J input to that flip flop. Flip flop 112 has its Q output connected to the clear input of flip flop 113 and to its K input. The Q— output of flip flop 112 is connected to its K input. Flip flop 113 has its Q output connected to its J input and to the clear input of flip flop 114. The Q— output of flip flop 113 is connected to its J input and also to the inputs of OR gate 108 and NOR gate 109. Flip flop 114 has its Q output connected to its K input and also to the other input to OR gate 108, further providing the signal ALSHRT which provides an input to AND gate 102 (FIG. 2E). The Q— output of flip flop 114 is connected to its J input and to an input of NOR gate 109. The logic circuitry comprising NOR gate 109, OR gate 108 and NAND gate 116 aid in squaring the output pulse. Input SQF, which is applied through inverter 115 to the other input of NAND gate 116 and directly to NOR gate 109, is a squelching input for squelching the output square wave. OR gate 108 provides the other input to NAND gate 116 whose output is connected to the gates of transistors Q26 and Q28, respectively. The output of NOR gate 109 is connected to the gate of transistor Q27 which has one main electrode connected to one main electrode of transistor Q26 whose other main electrode is grounded. Transistor Q27 has another main electrode connected to one input operational amplifier 117. One main electrode of transistor Q28 is connected to voltage VTR (a reference voltage from FIG. 6) and the other main electrode is connected to the one input of opamp 117. Capacitor C10 is connected between the main electrodes of transistors Q26 and Q27 to ground and capacitor C11 is connected between the one input of opamp 117, and ground. The output of opamp 117 is signal T IN which is connected to the other input of opamp 117. Capacitor C11 is five times the size of capacitor C10. This particular configuration of transistor switches and capacitors provides for adding zero volts and five volts to center the carrier on the voltage reference VTR. The output signal T IN is the resultant square wave at the desired carrier frequency.

Figure 3B:
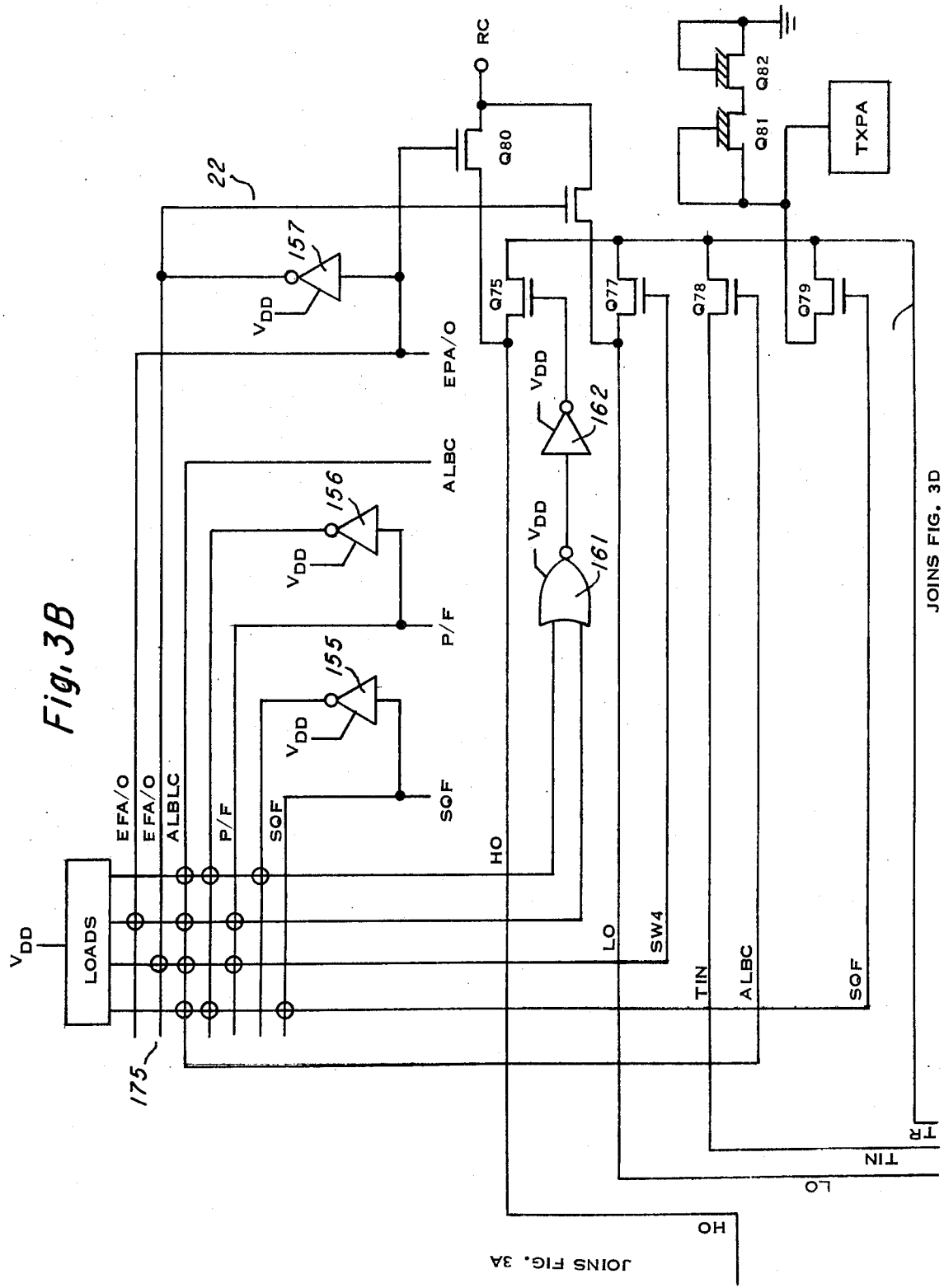

Turning now to FIGS. 3A–3D, schematic diagrams of the input multiplexer 14, output multiplexer 22, high BPF 15, low BPF 16 and LPF transmit 20 are shown schematically. On FIG. 3C, input multiplexer 14 is shown as comprising transistors Q71 through Q74, responsive to input signals. Signal T IN, the output from opamp 117 (FIG. 2F) is applied to one main electrode of transistor Q74 and to one main electrode of transistor Q72. Signal R IN, from LPF receive 19, is applied to one main electrode of transistor Q71 and to one main electrode of transistor Q73. The other main electrodes of transistors Q71 and Q72 are tied together to provide signal H IN and the other main electrodes of transistors Q73 and Q74 are tied together to provide signal L IN. Exclusive OR gate 170 receives an input from signal A/O (answer or originate, FIG. 2D) and from signal ALBC (analog loop back), a test signal. The output of Exclusive OR gate 170 is signal EFA/O which is applied to the gates of transistor Q71 and Q74. Signal EFA/O is inverted through inverter 171 and applied to the gates of transistors Q72 and Q73. Therefore, a signal A/O determined the state of the multiplexer 14. If for example signal A/O="1", then the gates of transistors Q71 and Q74 will be selected. For signal T IN, Q74 will be turned on, thereby placing signal T IN on the L IN line to the low band pass filter 16. Signal R IN, on the other hand, will be transmitted through Q71 and placed on line H IN to high band pass filter 15. If A/O=0, then transistors Q72 and Q73 will be turned on, in which case signal T IN will be conducted through transistor Q72 and output signal H IN to high band pass filter 15. Signal R IN will be conducted through transistor Q73 and output as signal L IN to low band pass filter 16. FIG. 3B illustrates the output multiplexer 22. ROM 175 has, a control signal, SQF, P/F, EFA/O and their reciprocals. Also, the test signal ALBC serves as an input. The outputs from the output multiplexer 22 are the signals RC, which is applied to AGC 17, and TR, which is applied to BPF transmit 20. Input signals to multiplexer 22 are the signal "LO" from the low band pass filter 16 and the signal "HO" from the high band pass filter 15. T IN, in conjunction with test signal ALBC, is also input to output multiplexer 22 for testing purposes. The control signals provide output signals from the ROM to cause the input signals to be diverted either to the AGC 17 or to the LPF transmit 20. For example, the HO signal is gated through transistor Q80 by the signal EFA/O, as signal RC to the AGC 17. Signal LO is gated through transistor Q76 to AGC 17 as signal RC. Signal HO may also be gated through transistor Q75 as signal TR to LPF transmit 20. The first and second lines of ROM 175 provide inputs to NOR gate 161 whose output is inverted through inverter 172 and provides the gate signal for transistor Q75. Signal LO may also be transferred through transistor Q77 as signal TR to LPF transmit 20, transistor Q77 being gated by the third line from ROM 175. The fourth line of ROM 175 gates transistor Q79, which permits the transfer of a signal applied to terminal TXPA (an external analog input) as signal TR. Transistor Q78 is gated by signal ALBC and transfers signal T IN to LPF transmit 20 for test purposes. Transistors Q81 and Q82, connected to diodes, are serially connected to ground and to the external analog input terminal TXPA.

High band pass filter 15 and low band pass filter 16 are identical in structure. The size of the capacitors in these switched capacitor filters differs. Section 15a (FIG. 3A) received input signal H IN through the first main electrode of transistor Q50, gated by sample clock phase 4 to a second main electrode. Capacitor K1C1 is connected in series with the second main electrode and also in series with the first main electrode of transistor Q59 which is gated by phase 4, having a second main electrode connected to the negative terminal of operational amplifier 151. Transistor Q51, gated by phase 3 is connected from the second terminal of transistor Q50 to ground. Transistor Q52, gated by phase 3 is connected from the one main terminal of transistor Q59 to ground. The positive terminal of opamp 151 is grounded and the output of opamp 151 is fed back via capacitor C1 to its negative input terminal. This structure, so far described, is representative of the typical switched capacitor function.

The output of opamp 151 is applied to one main electrode of transistor Q53 which is gated by phase 3 to a second main electrode. Capacitor K5C2 is connected in series with the second main electrode of transistor Q53 to a first main electrode of transistor Q56, which is gated by phase 4. The second main electrode of transistor Q56 is connected to the negative input of operational amplifier 152 and is also connected, by way of capacitor K4C2 to the one main electrode of transistor Q50. Transistor Q54, gated by phase 4, is connected from the second main electrode of transistor Q53 to ground. Transistor Q55, gated by phase 3, is connected from the first main electrode of transistor Q56 to ground. The positive terminal of opamp 152 is grounded and its output is fed back via capacitor C2 to its negative input. The output of opamp 152 is also connected through the first main electrode of transistor Q57, which is gated by phase 4, to its second main electrode which is connected to one terminal of capacitor K2C1 and one terminal of capacitor K6C2. The other terminal of capacitor K2C1 is connected to the first main electrode of transistor Q59, and the other terminal of capacitor K6C2 is connected to the first main electrode of transistor Q56. Transistor Q58, gated by phase 3, is connected from the second main electrode of transistor Q57 to ground. Filter section 15b is identical to filter section 15a except for the values of capacitance.

Filter section 15c receives an input from filter section 15b via capacitor K12C5 to the negative input of operational amplifier 153 whose positive input is grounded. The output of opamp 153 is fed back via capacitor C5 to its negative input. The output also is connected to the negative input of operational amplifier 154 via transistors Q63 and Q66, gated by phase 3, transistors Q64 and Q65 gated by phase 4, and capacitor K15C6, where these components all correspond in electrical connection to transistors Q50 and Q59, transistors Q51 and Q52, and capacitor K1C1 of FIG. 15A. The positive terminal of opamp 154 is grounded and its output is fed back to its negative input via capacitor C6. The output of opamp 154 is signal HO. The input to filter section 15c is connected, via capacitor K16C6, to the negative input terminal of opamp 154.

One terminal of capacitor K2C1 is attached to the connection between main electrodes of transistors Q52 and Q59. The other terminal of capacitor K2C1 is connected to one terminal of capacitor K6C2 and to the connection between main electrodes of transistors Q57 and Q58. The other terminal of transistor K6C2 is connected to the connection between main electrodes of transistors Q55 and Q56. Transistor Q58 is gated by phase 3 and its other main electrode is connected to ground. Transistor Q57 is gated by phase 4 and its other main electrode is connected to the output of an operational amplifier 152.

Operational amplifier 152 has an output that connects to the input of filter section 15b which is identical to section 15a, described above, except for capacitor values. The output of filter section 15b provides the input to filter section 15c, a switched capacitor filter. The output of filter section 15b is applied, via capacitor K12C5 to one input of OPAMP operational amplifier 153, and via capacitor K16C6 to the one input of operational amplifier 154. The other input to both of operational amplifiers 153 and 154 is grounded. Capacitors C5 and C6 provide feedback from the output to the one input of each of operational amplifiers 153 and 154, respectively. One main electrode of transistor Q4 is connected to the one input of operational amplifier 153, is gated by phase 4 and has its second main electrode connected to one main electrode of transistor Q61 and to one terminal of transistor K13C5. Transistor Q61 is gated by phase 3 and has its other main terminal connected to ground. The other terminal of capacitor K13C5 is connected to one terminal of capacitor K14C6 and to the connection between the main electrodes of transistors Q68 and Q67. Transistor Q68 is gated by phase 4 and its other main electrode is connected to ground. Transistor Q67 is gated by phase 3 and its other main electrode is connected to the output of operational amplifier 154. The output of operational amplifier 153 is connected through transistor Q63, which is gated by phase 3 to one terminal of capacitor K15C6 whose other terminal is connected, through transistor Q66, which is gated by phase 3, to one input of operational amplfier 154. Transistors Q64 and Q65, each gated by phase 4, are connected across capacitor K15C6 to ground. The output signal from section 15c of high bandpass filter 15 is signal HO which provides one input to output multiplexer 22.

To summarize, squarewave input H IN is applied to section 15a of high bandpass filter 15. Section 15a is a sixth order, switched capacitor filter which integrates the squarewave input. That is, capacitor K1C1 and capacitor C1 share the charge provided by the incoming signal H IN. This is done during phase 4 with discharge following at phase 3. Integration is continued in the next identical section of filter section 15a. Still further integration is done in exactly the same manner in filter section 15b and finally, in the same manner, in section 15C. Secion 15c differs in that capacitors K13C5 and K16C6 are provided to block offset DC voltage that accumulates. The output signal from section 15C, HO, approximates a sine wave.

The low bandpass filter 16 is comprised of three sections identical to the high bandpass filter 15 except for the values of capacitance. The output signal LO, from low bandpass filter also approximates a sine wave.

LPF receive circuit 19 is made up of a continuous low pass filter 19a (FIG. 3d) and a sampled low pass filter 19b (FIG. 3c). Filtwer 19b is identical to section 15a except for the values of capacitance.

Figure 3D:
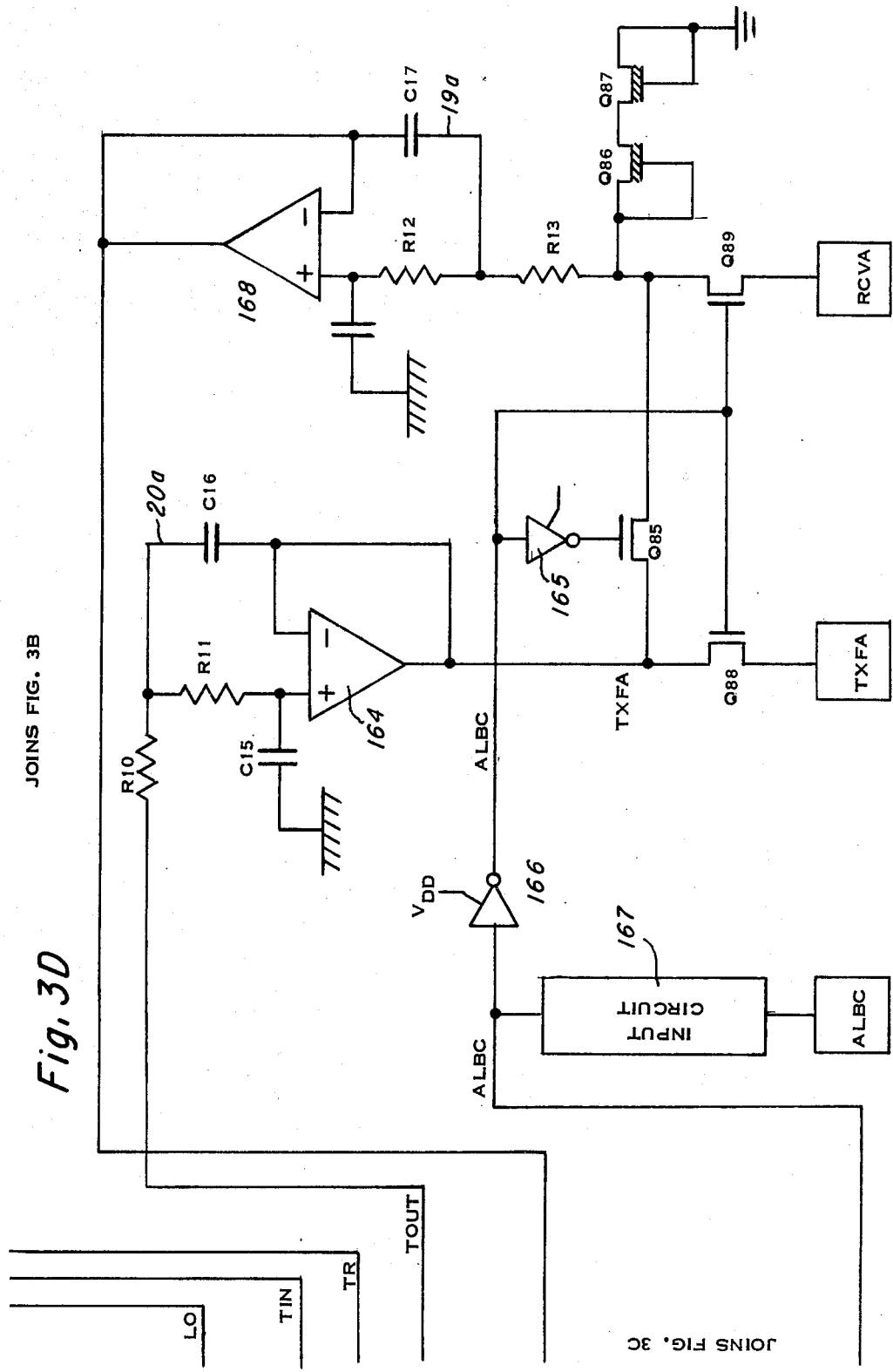

FIG. 3d illustrates signal RCVA, passing through transistor Q89 which is turned on when the test signal ALBC is not present, through resistor R13 and then through resistor R12 to one input of operational amplifier 168. Capacitor C17 is connected between the one input of OPAMP 168 ground. The ouput of OPAMP 168 is connected to its other input and also, through capacitor C17, to the intersection between resistors R12 and R13. The output signal, RC IN is transmitted to the receive filter 19b.

LPF transmit 20 is made up of continuous lowpass filter 20a of FIG. 3D and sample low pass filter 20b (FIG. 3C). Filter 20b is identical to filter section 20b.

The output from filter 20b, T OUT is sent to the continuous filter 20a, through resistor R10 and through resistor R11 to one input of operational amplifier 164. Capacitor C15 is connected from the one input of OPAMP 164 to ground. The output of OPAMP 164 is connected to its other input, through resistor C16 to the intersection of resistors R10 and R11 and through transistor Q88 (which is gated on when test signal ALBC is not present) to output terminal TXFA.

The test signal ALBC is received through input circuit 167 (identical to input circuit 25 previously described) and inverted through inverter 166, then applied to the gates of each of transistors Q88 and Q89. The inverted signal is also inverted through inverter 165 to gate transistor Q85 which is connected between transistors Q88 and Q89. Signal ALBC is also connected (FIG. 3C) as one input to Exclusive OR circuit 170. Signal ALBC is a test signal provided for testing the MODEM circuits.

Figure 4A:
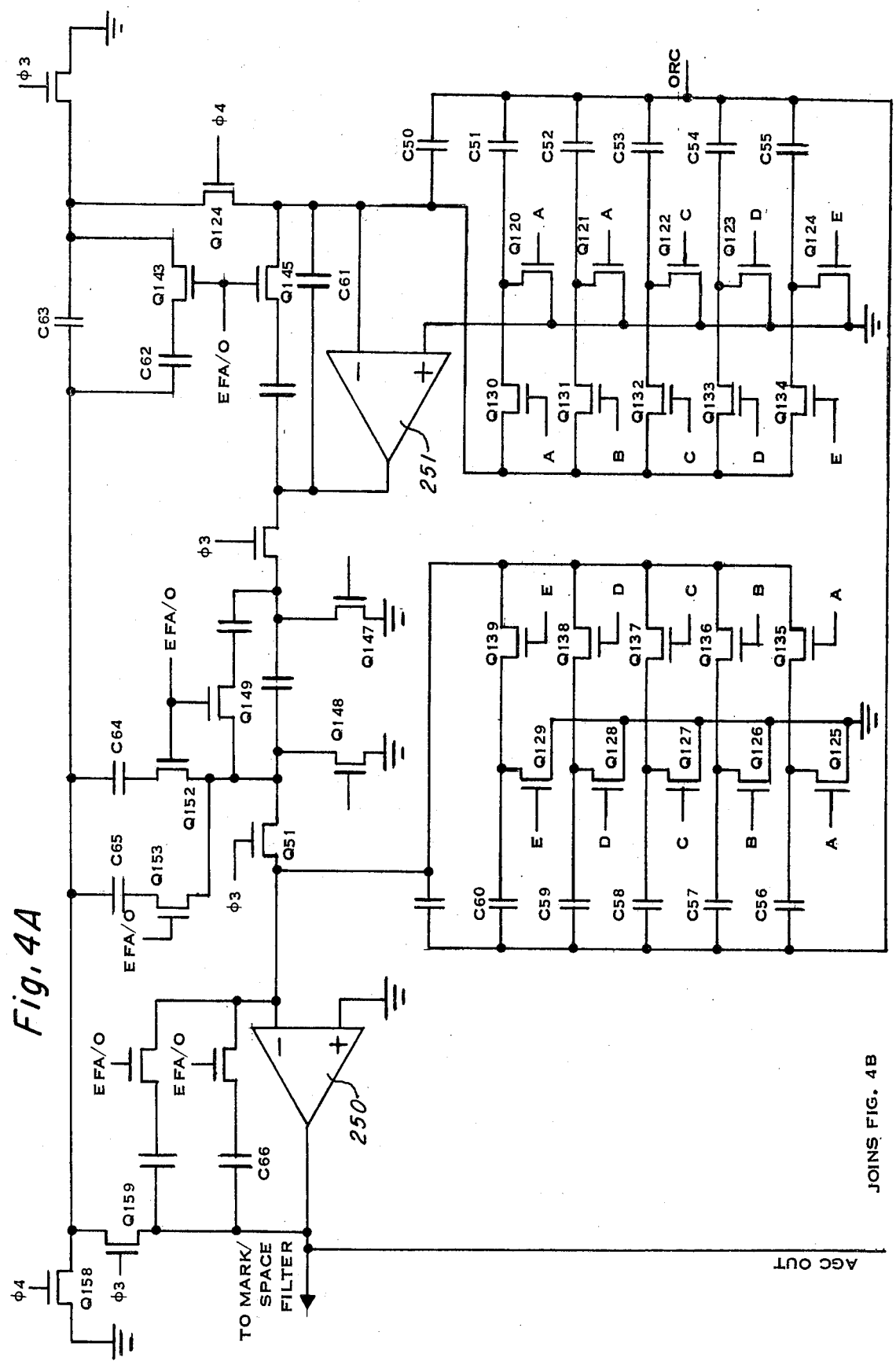
FIGS. 4A-4C form the schematic diagram of the automatic gain control circuit.
Figure 4B:
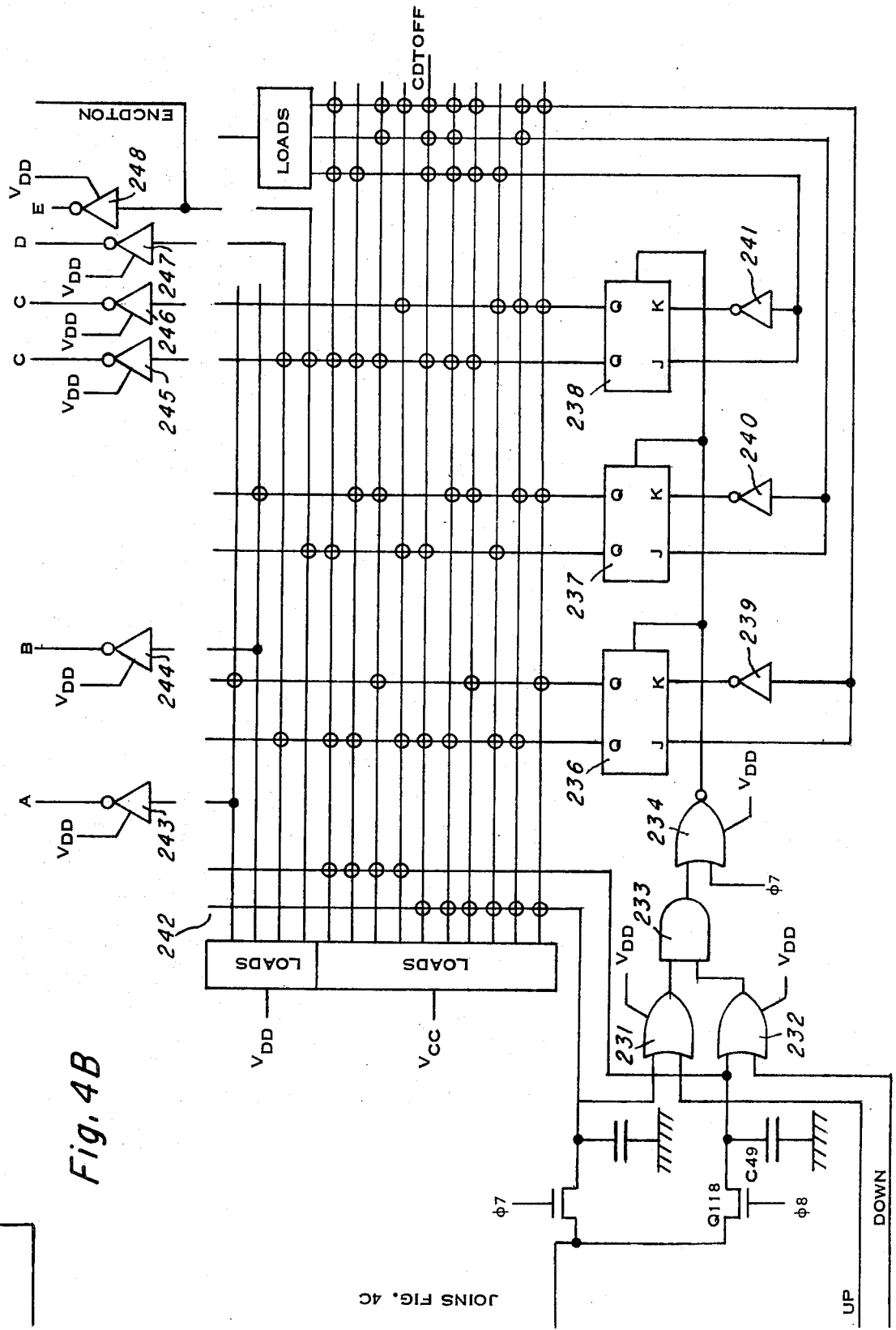
Figure 4C:
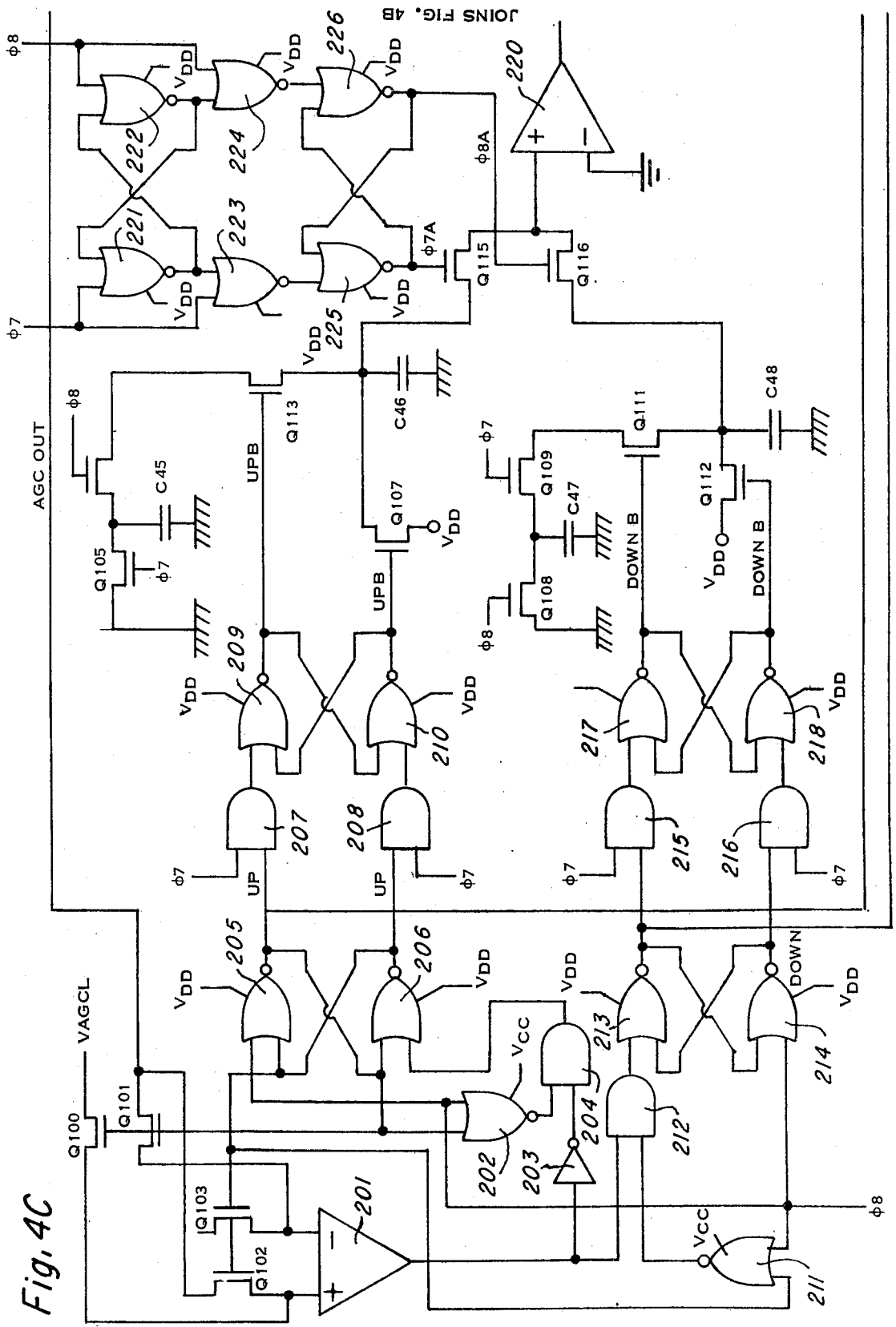

FIGS. 4A, 4B and 4C joined as indicated, form a schematic diagram of the automatic gain control circuit 17 of this invention. Programmable logic array (PLA) 242 has certain inputs which will be described later and provides outputs in response thereto. Output A is inverted through inverter 243, providing output A—. Output B is inverted through inverter 244, providing output B—. Output C is inverted through inverter 245, providing output C—. Output C— is inverted through inverter 246, providing output C. Output D— is inverted through inverter 247, providing output D. Output E— is inverted through inverter 248, provding output E. A ladder network of capacitors and appropriate switches, responsive to the signals A through E and their negations, provide the control to the ladder network which select the particular combinations of capacitance to provide the appropriate gain. These capacitors are each twice as large as the succeeding capacitor so that a 6 db change is made at each step. Capacitor C51 has one terminal connected to terminal "RC" and its other terminal connected to one main electrode of transistor Q120 which is gated by signal "A" to ground and trhough transistor Q130, gated by signal A—, to one input of oprational amplifier 251. Capacitors C52 through C55 are connected in exactly the same way with respect to transistors Q121–Q124 and transistors Q131 through Q134 where transistors Q121 through transistor Q124 correspond to transistor Q120 and transistors Q131 through Q134 correspond to transistor Q130. Transistors Q21 through Q124 are gated by signals B through E, respectively and transistors Q131 through Q134 are gated by signals B— through E—, respectively. In this preferred embodiment, capacitor C55 is 2.022 square mils, capacitor C54 is 4.043 square mils and so on. The capacitor values referred to in this invention all refer to the area taken by the particular capacitor.

Capacitors C56 through C60 are connected to ground through transistors Q125 through Q129 and to the other side of operational amplifier 250 through transistors Q135 through Q139, respectively. Transistors Q125 through Q129 are gated by signals A through E, respectively, and transistors Q135 through Q139 are gated by signals A— through E— respectively. Capacitor C50 is connected from the other input of oprational amplifier 251 to terminal "RC" and capacitor C49 is connected between the other terminal of operational amplifier 250 and terminal "RC". Capacitor C60 is 1.259 square mils, capacitor 59 is 2.518 square mils and so on. Thus by adding and subtracting capacitors, the overall gain of the circuit is affected, determined by the amplitude of the incoming signal, "RC".

The second order bandpass filters, employing the switchable capacitors are used to form the output signal to be tested by the mark and space filters. The output of operational amplifier 251 is fed back to its one input via capacitor C61, its other input being grounded. The output of OPAMP 251 is also connected via capacitor C70 through transistor Q145, gated by signal EFA/O, to its one input. The output of OPAMP 251 is sent through transistor Q146, gated by phase 3, through transistor Q147, gated by phase 4, to ground, and to one terminal of capacitors C71 and C72, respectively. The other terminal of capacitor C71 is connected through transistor Q149, gated by signal EFA/O, to the other terminal of capacitor C72, and through transistor Q148, gated by phase 4, to ground.

The one input to operational amplifier 250 is connected through transistor Q151, gated by phase 3, to the other terminal of capacitor C72. The other terminal of OPAMP 250 is grounded. The output of OPAMP 250 provides the output singal to the mark and space filters and is fed back via capacitor C66 and transistor Q156, gated by signal EFA/O, to its one input. There is also a feedback path from the output of OPAMP 250 via capacitor C73 and transistor Q155 which is gated by signal EFA/O—.

The output of OPAMP 250 is gated by phase 3, through transistor Q159 and through transistor Q158, gated by phase 4, to ground. The output of OPAMP 250, through transistor Q159 is also connected to one terminal of capacitor C62, C63, C64 and C65. Capacitor C62 is connected through transistor Q143, gated by signal EFA/O, to the other terminal of capacitor C63, through transistor Q141, gated by phase 3, to ground. The other side of capacitor C63 is also connected through transistor Q142 gated by phase 4, to the one input of operational amplifier 251. The other terminal of capacitor C64 and the other terminal of capacitor C65 are connected through transistor Q152 and transistor Q153, gated by signals EFA/O and EFA/O—, respectively, to the other terminal of capacitor C72. The other terminal of capacitor C72 is also connected through transistor Q149, gated by signal EFA/O, to the other terminal of capacitor C71.

The output of operational amplifier 250 (FIG. 4A), identified as "AGC OUT" carries a sine wave of a particular amplitude and frequency. The frequency, of course, determines the binary value of the incoming signal. The amplitude, however, is adjusted from being too large or too small. The AGC OUT signal is applied to the negative terminal of comparator 201 through transistor Q101 which is gated by the output from NOR gate 205. Signal AGC OUT is also applied to the positive terminal of comparator 201 through transistor Q102 which is gated by the output of NOR gate 206. NOR gates 205 and 206 form a latch circuit. Reference voltage $V_{ABCL}$ is applied to the positive input of comparator 201 through transistor Q100 which is gated by the output from NOR gate 205. Reference voltage $V_{AGCH}$ is applied to the negative terminal of comparator 201 through transistor Q103 which is gated by the output from NOR gate 206. Therefore, if the signal AGC OUT goes below the reference $V_{AGCH}$, the incoming signal is large enough. If signal AGC OUT crosses the $V_{AGCL}$ reference, then the signal is too large. When NOR gate 206 is "1", then reference $V_{AGCH}$ is impressed on the negative terminal of comparator 201 to be compared with signal AGC OUT. When NOR gate 205 is a "1", then signal $V_{AGCL}$ is applied to the positive terminal of comparator 201c to be compared with signal AGC OUT impressed on the negative terminal. As stated above, when the references are met, the state of comparator 201 changes and the logic circuitry made up of up and down latches, etc. are activated.

The output from comparator 201 is inverted through inverter 203 and provides an input to AND gate 204. AND gate 204 provides one input to NOR gate 206 whose output provides one input to NOR gate 205 whose output provides an input to NOR gate 206 as well as to NOR gate 202. Another input to NOR gate 202 is provided by phase 8 and the output of NOR gate 202 provides the other input to NAND gate 204. The output from NOR gate 205 provides one input to AND gate 207 and a UP— input to OR gate 231 (FIG. 4b). The output of NOR gate 206 provides one input to AND gate 208. Phase 7 provides the other input to each of AND gates 207 and 208 whose outputs provide inputs to NOR gate 209 and NOR gate 210, respectively. NOR gates 209 and 210 form a latch circuit with the output from NOR gate 210 providing the other input to NOR gate 209, and the output from NOR gate 209 providing the other input to NOR gate 210. The output from NOR gate 209 gates transistor Q113 and the output from NOR gate 210 gates transistor Q107. One main electrode of transistor Q107 is connected to reference $V_{DD}$ and the other main electrode is connected to one terminal of capacitors C46 and to the positive terminal of comparator 220 through transistor Q115 gated by phase 7A (to be described). The other terinal of capacitor C46 is connected to ground (analog). The one terminal of capacitor C46 is connected through transistor Q113 and through transistor Q106, gated by phase 8, through transistor Q105, gated by phase 7, to ground (analog). One terminal of capacitor C45 is connected between the main electrodes of transistors Q105 and Q106 to ground (analog). It should be noted that capacitor C45 is one square mil in area and capacitor C46 is ten square mils in area. Capacitor C46, when charged indicates whether the signal should go up or down. Likewise, capacitor C48 in the down logic, of the same size as capacitor C46 indicates whether the signal should be adjusted up or down.

The down circuitry is identical to the up circuitry described, with capacitor C47 being of one square mil size and capacitor C48 being of ten square mils size. The one terminal of capacitor C48 is connected through transistor Q116, gated by phase 8A, to the positive terminal of comparator 220 whose negative terminal is grounded.

Phases 7 and 8 are stretched into phases 7A and 8A to provide time for comparator 220 to react. This is accomplished by a latching circuits. Phase 7 provides an input to each of NOR gates 221 and 223. Phase 8 provides an input to each of NOR gates 222 and 224. NOR gates 221 and 222 are connected as a latch circuit.

The output of NOR gate 223 provides one input to NOR gate 225 and the output of NOR gate 224 provides one input to NOR gate 226. NOR gates 225 and 226 are connected as a latch circuit. The output then, of NOR gate 225, provides phase 7A and the output of NOR gate 226 provides phase 8A. Thus, the gates of transistors Q115 and Q116 permit the output charges from capacitors C46 and C48 respectively to be applied to the positive input of comparator 220 for several cycles.

FIG. 4B illustrates a logic circuit, including an up-down counter, for changing the amplitude of the input signal RC.

Specifically, the output from comparator 220 is applied through transistor Q117, gated by phase 7 to one line or ROM 242, to one terminal of capacitor C75 and to one input of OR gate 231. The output from comparator 220 is also applied through transistor Q118, gated by phase 8 to a second line of ROM 242, to one terminal of capacitor C76, and to one input of OR gate 232. The other terminal of capacitors C75 and C76 is connected to ground (analog). The two inputs to the ROM, mentioned above, determine whether the counter will be counted up or down. Signal UP—, from the output of NOR gate 205 provides the other input to OR gate 231. The DOWN— output from NOR gate 213 provides the other input to OR gate 232. The outputs from OR gates 231 and 232 provide the inputs to AND gate 233 whose output provides one input to NOR gate 234. The other input to NOR gate 234 is provided by phase 7—. The output from NOR gate 234 provides the clear input to flip flops 236, 237 and 238. Three separate output lines from ROM 242 provide the J inputs to flip flops 236, 237 and 238, respectively. The signals provided on these lines are also inverted through inverters 239, 240 and 241 to provide the K inputs, respectively, to flip flops 236, 237 and 238. The Q and Q— outputs from each of flip flops 236, 237 and 238 are connected to lines in the ROM, and select signals A through E and their inverse functions. These select signals are employed in connecting the ladder capacitors in and out of the circuit as described earlier.

Figure 5B:
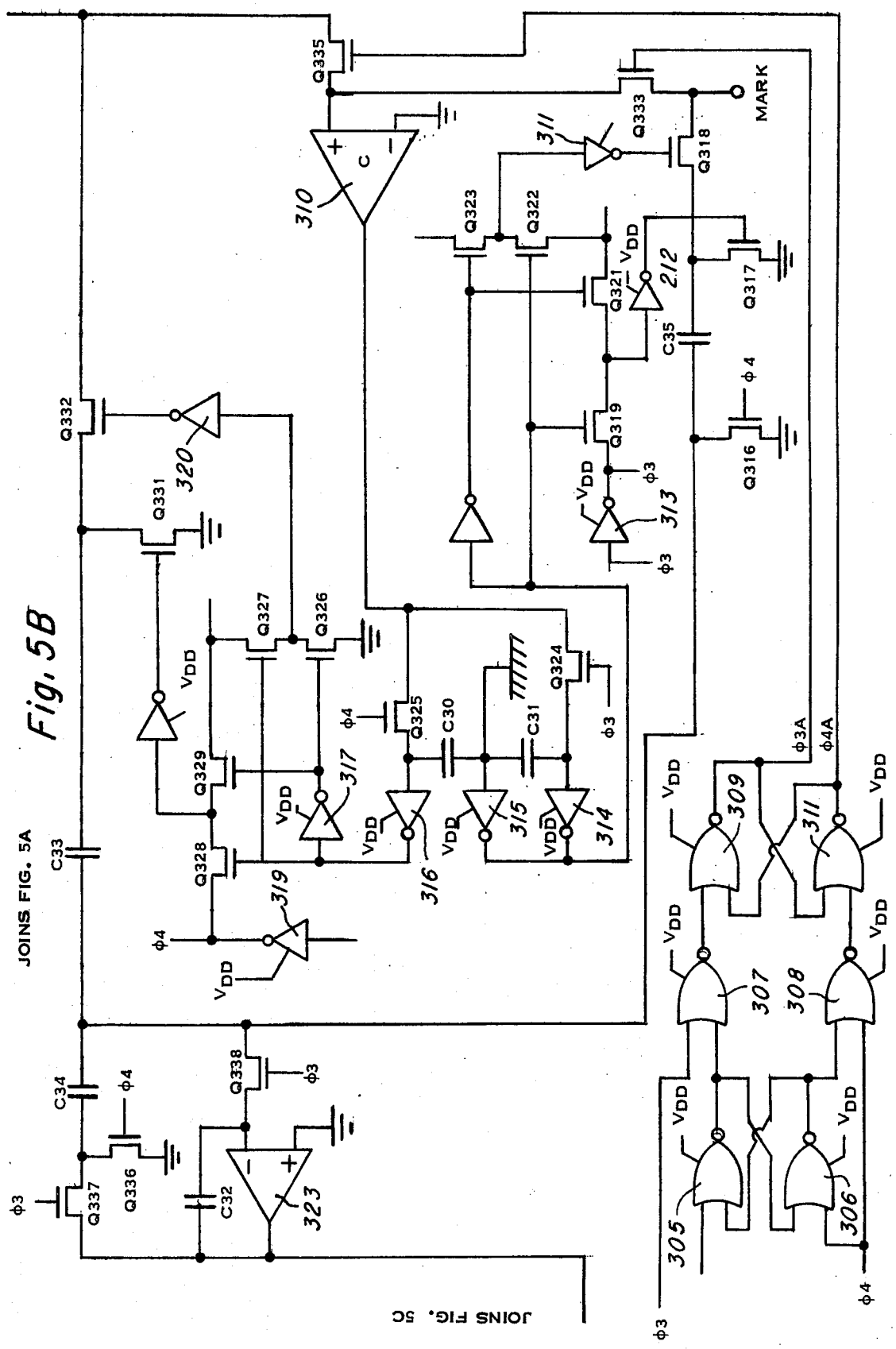
FIGS. 5B-5C form a schematic diagram of the four way rectifier, converting circuitry and carrier detect circuitry.
Figure 5C:
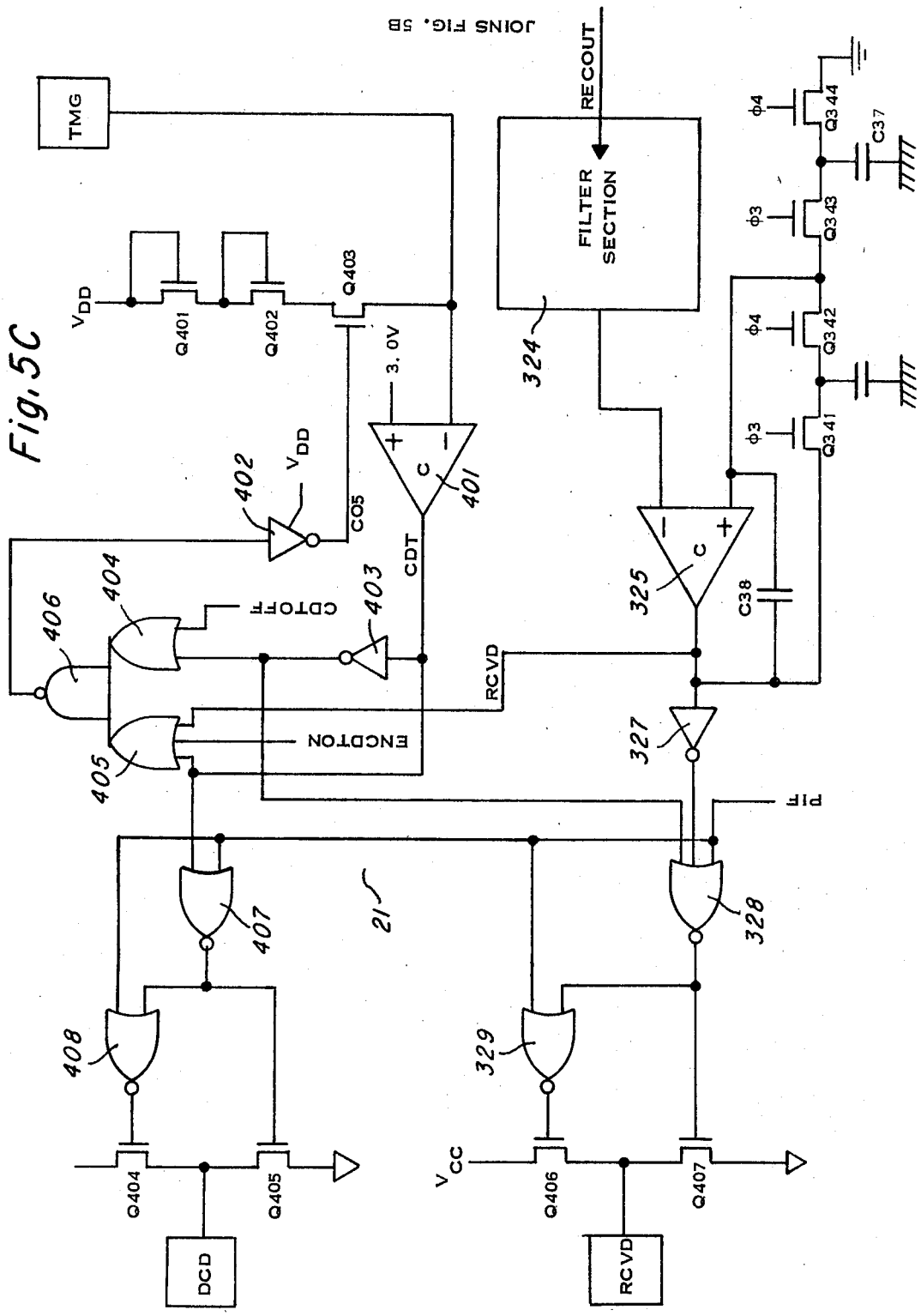

FIGS. 5A, 5B and 5C, connected as indicated schematically describe the demodulator 18 and carrier detect 21. FIG. 5A specifically details the mark and space filters. For purposes of description, the space filter will be described, but it is understood that the mark filter is identical except for the values of capacitance.

The space filter of FIG. 5A actually comprises two filters, each identical to section 15c of high bandpass filter 15. The configuration, in this preferred embodiment, permits response to the mark or space frequency of either of the first or second frequency band. If the modem is operating as an answering modem, then the frequency band received will be the first band. If the modem is operating as the originating modem, then the second frequency band will be received. The signal input "A/O" determines the mode of operation. That mode of operation is reflected in the signal EFA/O and its negation. The input signal, AGC OUT, from the AGC circuit 17, is input via capacitors K3C1 and (K3C1)' through transistors Q313 and Q315, respectively to one input of operational amplifier 302 whose other input is grounded. Transistor Q313 is gated by signal EFA/O and transistor Q315 is gated by signal EFA/O—. Therefore, either band of received signal may be received by this space filter. Operational amplifier 302 is equivalent to operational amplifier 153 of section 15c and operational amplifier 301 is equivalent to operational amplifier 154 of section 15C. The other components shown are the obvious equivalents to those of FIG. 15C. It should be noted that the equivalent parallel paths are connected in, depending upon the mode of operation of the modem. For example, transistor Q309 is gated by signal EFA/O to provide a path for capacitor K4'C2. Transistor Q308 is gated by signal EFA/O to provide a path for capacitor K4C2. Signal EFA/O gates transistor Q317 to provide a path for capacitor K1'C1. Signal EFA/O gates transistor Q304 to provide a path for capacitor K5C2. Signal EFA/O— gates transistor Q303, providing a path for capacitor K5'C2. The output from the space filter is applied through transistor Q335, gated by phase 4A, to one input of comparator 310 whose other input is grounded (FIG. 5B). Phase 3A and phase 4A are provided from a circuit identical to that described for the generation of phases 7A and 8A. This circuit is shown but need not be described.

The output from the mark filter is applied through transistor Q333, which is gated by phase 3A, to the one input of comparator 310. The output from comparator 310 is applied through transistor Q325, gated by phase 4 to charge capacitor C30. The output from comparator 310 is also gated through transistor Q324 by phase 3 to charge capacitor C31. Capacitors C30 and C31 are charged to a certain amplitude determining whether the received signal is a mark or space and whether they should be inverted. Capacitors C30 and C31 are tied to ground (analog). The charge on capacitor C30 is inverted through inverter 316 and provides gating for transistors Q328 and Q327. The output of inverter 316 is inverted through inverter 317 whose output provides gating for transistors Q329 and Q326. The charge on capacitors C31 is inverted by inverter 315 and is applied to the gates of transistors Q319 and Q322. The output from inverter 315 is further inverted through inverter 314 and applied to the gates of transistors Q321 and Q323. When transistor Q323 is gated, phase 3 is appllied to the gate of transistor Q318. Transistor Q321 is gated at the same time, placing phase 4 on the gate of transistor Q317. When the output of inverter 315 is high, then transistor Q319 is gated and phase 3 is applied to the gate of transistor Q317. At the same time, transistor Q322 is gated, applying phase 4 to the gate of transistor Q318. Therefore, depending upon the state of capacitor C31, phase 3 and phase 4 are "swapped" between transistors Q318 and Q318.

The mark input is applied through transistor Q318, gated by either phase 3 or phase 4, grounded through transistor Q317 by either phase 4 or phase 3, and transmitted to charge capacitor C35. Capacitor C35 is tied to one main electrode of transistor Q316 and through transistor Q338, gated by phase 3, to one input of operational amplifier 323, whose other input is grounded. Feedback capacitor C32 is connected from the output of operational amplifier 323 back to its one input. Phase 3 is inverted through inverter 313 and applied through transistor Q319 as stated above. Phase 4 is applied via transistor Q321.

When phase 4 gates transistor Q317, then the combination of the transistor, capacitor C35, transistor Q316 and transistor Q338 forms an inverting integrater. If phase 3 is applied to transistor Q317, then a noninverting integrater is formed.

The space input is applied through transistor Q332 to ground through transistor Q331 and to one terminal of capacitor C33. Capacitor C33 has its other terminal connected through transistor Q338 to the one input of operational amplifier 323. Capacitor C30 is connected to inverter 316 whose output gates transistors Q328 and Q327. The output of inverter 316 is also connected to the input of inverter 317 whose output gates transistors Q329 and Q326. Phase 4 is inverted through inverter 319 and applied through transistor Q328 to inverter 318 so that phase 4 is applied to the gate of transistor Q331 when the output of inverter 316 is high. Phase 3— is applied through transistor Q327, gated when inverter 316 is high and inverted through inverter 320 to be applied to the gate of transistor Q332. Thus phase 4 is applied to the gate of transistor Q331 and phase 3 is applied to the gate of transistor Q332 when inverter 316 is high. When inverter 317 is high, then phase 4— is applied through transistor Q326 in inverted by inverter 320 to apply phase 4 to the gate of transistor Q332. At the same time, phase 3— is applied through transistor Q329 and inverted through transistor 318 to the gate of transistor 331. The result of this circuitry is to provide positive rectification for the mark input and negative rectification for the space input. The two signals are summed in operational amplifier 323 and since one is positive and one is negative, it amounts to the difference being provided at the output of operational amplifier 323. If the mark signal is larger in amplitude than the space signal, a high signal will come out of operational amplifier 323. On the other hand, if space signal is larger than the mark signal, a low signal will come out.

The output of operational amplifier 323 is connected through transistor Q337, gated by phase 3 to ground through transistor Q336, gated by phase 4, and through capacitor C34 to the other terminal of capacitor C33. The output of operational amplifier 323 also provides an input to filter section 324 (FIG. 5C) which is identical to filter section 15a of high bandpass filter 15 except for the values of capacitance. Filter section 324 provides output signal RCV, a smoothed waveform. The output from comparator 325 is fed back via capacitor C38 to its positive input and also through transistor Q341, gated by phase 3, and through transistor Q342, gated by phase 4, back to its positive input. Capacitor C36 is connected between transistors Q341 and Q342 to ground (analog). The positive input of comparator 325 is also connected through transistor Q343, gated by phase 3, and through transistor Q344, gated by phase 4, to ground. Capacitor C37 is connected between transistors Q343 and Q344 to ground (analog). Capacitors C36 and C37 provide hysteresis to reduce switching error. Comparator 325, by comparing to an analog reference, squares off the RCV signal to actual received data which is inverted through inverter 327 and applied as one input to NOR gate 328. The output from comparator 325 is also applied to OR gate 405 which has input ENCDTON— from FIG. 4B as an input. A timing signal, of a duration supplied by an external RC circuit is applied to terminal TMG, providing an input to the negative terminal of comparator 401 whose other input is a 3.0 volt reference voltage applied. Voltage $V_{DD}$ is applied through transistors Q401 and Q402, connected as diodes, and through transistor Q403, gated by the output of inverter 402 to the negative input of comparator 401. The output of comparator 401 provides one input to NOR gate 407 and the final input to NOR gate 405. Comparator 401 is connected to inverter 403 which provides one input to OR gate 404 and one input to NOR gate 328. The other input to NOR gate 328 is supplied by the input signal P/F— which is also applied as one input to NOR gate 329 and as the one input to NOR gate 407 and NOR gate 408. The other input to OR gate 404 is signal CDT OFF from ROM 242 (FIG. 4B). OR gates 404 and 405 provide inputs to NAND gate 406 whose output is connected to the input of inverter 402. The output from NOR gate 407 provides the other input to NOR gate 408 and gates transistor Q405 while NOR gate 408 gates transistor Q404 voltage. Voltage VV$_{CC}$ is conducted through transistor Q404 and through transistor Q405 to ground (digital). The carrier detect signal DCD is output between transistors Q404 and Q405.

The output of NOR gate 328 provides the other input to NOR gate 329 and provides the gating from transistor Q407. NOR gate 329 provides the gating for transistor Q406. Voltage V$_{CC}$ is applied through transistors Q405 and then transistor Q406 to ground (digital). The actual data received, signal RCVD is taken from a point between the main electrodes of Q405 and Q406.

Figure 6:
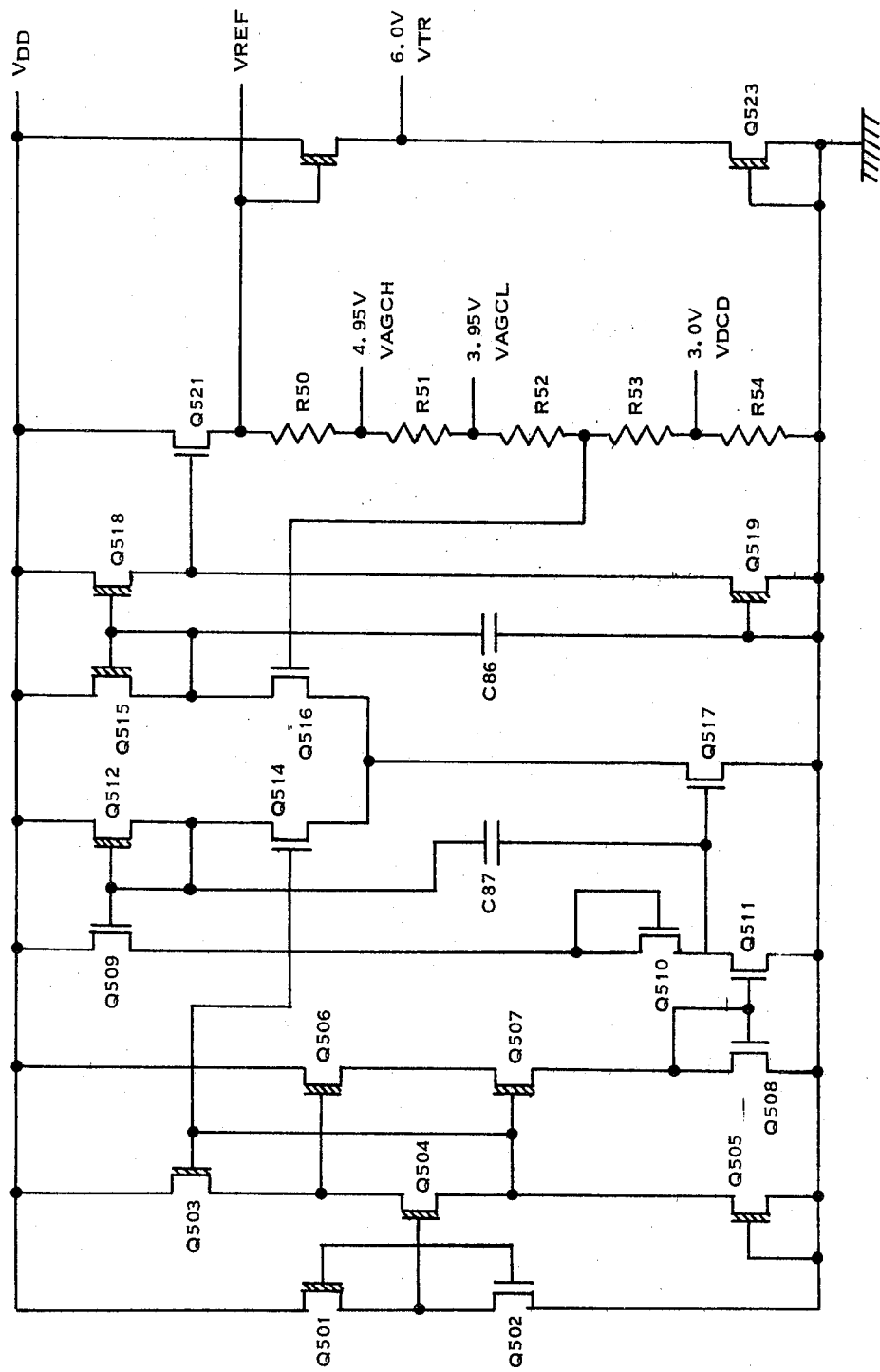
FIG. 6 is a schematic diagram of the voltage reference circuitry.

FIG. 6 illustrates the various transistors, capacitors and resistors used in generating the various voltage references. This particular technique is known in the art and the circuit need not be described in detail.

MODE OF OPERATION

Transmission

Referring again to FIGS. 2A-2C, oscillator 11 is shown having a crystal input of 4.032 megahertz (in this preferred embodiment). The choice of frequency is, of course, completely arbitrary. The oscillator circuit is well known and provides a clock output pulse.

The clock output pulse is the timing source for the pseudo random shift register made up of flip flops 37 through 43 and exclusive OR gate 46 and NOR gate 36 of sample clock 12. The ROM 50 associated with the pseudo random shift register is activated at particular, preselected times to provide the signals S1, R1, S2, R2 and ZII. Combination of these signals give discrete sample clock pulses phase 1 and phase 2. Phase 1 and phase 2 are further divided to provide phases 3, 4, 5 and 6. These phases are still further divided to provide also phases 7 and 8. The various sample clocks are used then throughout the modem. Phase 1 and phase 2 occur at a frequency of 103.4 KHz. Phases 3 and 4 occur at a frequency of 25.8 KHz. Phases 5 and 6 occur at a frequency of 6.5 KHz and phases 7 and 8 occur at a frequency of 0.8077 KHz.

Refer next to FIGS. 2D, 2E and 2F where the CLK output from oscillator 11 is shown as the timing source for the pseudo random shift register comprised of flip flops 85 through 93 and the associated logic circuitry. For purposes of illustration, presume that a frequency of 1270 hertz is to be transmitted. Then input TXD is high, input A/O is low, and input P/F is high. Under those circumstances, the input to ROM 60 illustrates that the first line is brought low, the third line is brought low, and the fifth line is brought low, leaving the line labeled 1270 high. Therefore, 1270 hertz has been selected. If the answer originate signal A/O had been high, then line 2225 would have been selected. If signal TXD had been low, then mark frequency 1070 or mark frequency 2025 would have been selected. In any event, the selected frequency is formed through the pseudo random shift register and the divide by sixteen counter, formed by flip flops 111 through 114. The signal ALSHRT signifies that a squarewave output is to be made up of the sum of four short (the output of flip flops 86 through 93) plus twelve long (the output of flip flops 85 through 93). The signal ENALSHRT (enable long short segment select) enables the ALSHRT signal, through associated logic circuitry to provide the four short and twelve long frames. In the same fashion, another squarewave requires that there be eight long and eight short which is provided by the signal ALT. That signal, through the associated logic, provides for the required eight long and eight short. Input signal P/F enables sixteen long frames. It can be seen that any of the various combinations to achieve the desired frequency may be made. The squarewave output train is centered on voltage reference VTR (from FIG. 6) at the input to operational amplifier 117, providing output T IN. Output T IN is shown as wave shape A in FIG. 7 illustrating first two spaces followed by two marks.

Next refer to FIG. 3C where input multiplexer 14 is illustrated. The signal T IN, through the multiplexer is either sent to the high bandpass filter 15 as signal H IN or to low bandpass filter 16 as signal L IN. The determination is made by the answer or originate mode signal A/O. If the signal is high, then signal EFA/O will be high. For purposes of this illustration please disregard signal ALBC, which is a test signal. If signal EFA/O is high, then T IN is transmitted to low bandpass filter 16. If EFA/O is low, then signal T IN is passed to high bandpass filter 15. Assume that the high bandpass filter 15 has been selected. Section 15a schematically illustrates a switched capacitor, high bandpass filter. Switched capacitor technology is known (see Bell System Technical Journal Volume 58, No. 10, December 1979) and in this preferred embodiment is equivalent to the combination of a resistor connected to one input of an operational amplifier whose other input is grounded and whose output is fed back through a capacitor to its one input. This equivalent circuit is formed of transistor switches Q50, Q51, capacitor K1C1, Switch Q52, switch Q59, operational amplifier 151 and feedback capacitor C1. The remaining circuitry comprises the second such section. Filter section 15b is identical to section 15a. Filter section 15c is nearly identical to section 15a and 15b, but has DC offset blocking capacitors K16C6 and K13C5. The filter sections comprising filter 15, by the selection of components values minimizes unwanted frequencies to form a sine wave output H O. Filter 16 is identical, but for component values, and provides signal L O. Signal H O is shown as waveform B in FIG. 7 following the squarewave signal T IN of waveform A.

Signal H O (and signal L O) are inputs to output multiplexer 22 shown in FIG. 3B. Input signals SQF and its negation, P/F and its negation, and EFA/O and its negation control the paths of input H O and L O. Signal ALBC, in combination with signal T IN is a special case for testing purposes. Signal SQF is a signal for squelching the squarewave output signal T IN (and is shown in that capacity in FIG. 2F). Those inputs to ROM 175 cause outputs from ROM 175 to ultimately select line TR for a generated sine wave signal from H O (or L O) to follow. If it were a received signal, as will be described later, the output RC would be followed.

Line TR provides an input to sampled low pass filter 20b which provides T OUT. Filter 20b is identical to filter 15A, except for the component values. Undesired frequencies are removed by filter 20b and signal T OUT is then applied to continuous low pass filter 20a shown in FIG. 3D. The combination of filters 20a and 20b provide the LPF transmit circuit 20 shown in FIG. 1 which provides the output FSK transmission.

Receiving

The input FSK sine wave is received at terminal RCVA of FIG. 3D, passes through continuous low pass filter 19a, and as signal RC IN to sample low pass filter 19b. Filter 19b is identical to filter 20b. The combination of filters 19a and 19b provides LPF receive 19 circuit of FIG. 1 for minimizing undesirable frequencies and for anti-aliasing. The output of filter 19b goes to input multiplexer 14 which then selects, on the basis of the state of A/O input, whether the received signal R IN is to go to the high bandpass filter 15 as signal H IN or to the low bandpass filter 16 as signal L IN. Assume again that the selection is such that high bandpass filter 15 is used. Then the same discussion with respect to the transmitted signal is applicable. Signal HO (and LO) are input to output multiplexer 22. In this case, the selection of control signals is such that the input signal goes out as signal RC. Signal RC is received by the automatic gain control circuit 17 shown in FIGS. 4A, 4B and 4C, joined as indicated, with signal RC coming in specifically at FIG. 4A. Some combination of capacitors C51 through C60 must be selected by reason of the count of the up/down counter formed primarily by flip flops 236, 237 and 238 shown in FIG. 4B. The combined values of the combination of switched-in capacitors have inputs to first section operational amplifier 251 and to second section operational amplifier 250. These two OPAMPS, together with the associated switches and capacitors form a two section filter, similar to those previously discussed. However, depending again upon the state of the A/O selection, capacitance is added and the circuit is tuned for a band containing frequencies 1070 and 1270 or 2025 and 2225 hertz. The output from operational amplifier 250 is signal AGC OUT which provides an input to the adjusting circuitry of FIG. 4C. First, reference voltage $V_{AGCH}$ (FIG. 6) is compared with the incoming AGC OUT signal. IF AGC OUT goes below $V_{AGCH}$, then the signal is large enough and comparator 201 changes state. When it changes state, signal UP goes low and UP— goes high gating signal $V_{AGCL}$ (FIG. 6) to be compared with input signal AGC OUT. If the sine wave crosses reference $V_{AGCL}$, it is too large and the signal DOWN goes high. Capacitors C46 and C48 store a charge, depending upon whether the signal is too large or too small. If it is too small and the signal is to be increased, then C46 charge is transferred via phase 7A (An extended phase 7) to comparator 220. Comparator 220 causes signal UPA— to input ROM 242 which in turn provides appropriate inputs to a counter formed by flip flops 236, 237 and 238 to increase the size of the AGC OUT waveform. In like manner, C48 transfers its charge at time phase 8A which results in signal DOWN A— inputting ROM 242 which in turn reduces the count of the up/down counter formed by flip flops 236, 237 and 238. The count of these flip flops provides output signals A through E and their negations as control signals for the capacitor ladder networks shown in FIG. 4A. The selection of capacitors then determines the gain of the amplifier of FIG. 4A which in turn controls the amplitude waveform AGC OUT.

FIG. 5A illustrates the space filter portion of the demodulator 18 of FIG. 1. That is, the signal AGC OUT is presented to a space filter and to a mark filter, which are very similar to section 15C of high bandpass filter 15, except for the values of capacitance and the fact that the selection of A/O determines those values. FIG. 5A specifically illustrates the space filter but it should be understood that the mark filter is identical but for the values of capacitance. FIG. 5A illustrates a switched to capacitor filter whose output signal is applied as the space input to the full wave rectifier shown in FIG. 5B. The purpose of this full wave rectifier is to compare the energy supplied by the space filter with that supplied by the mark filter (both shown as inputs). The comparison is not done directly but a summing is ultimately performed.

Waveform B of FIG. 7 illustrates the AGC OUT signal (as well as the FSK transmitted signal). Waveform C of FIG. 7 illustrates the output of the space filter and waveform D of FIG. 7 illustrates the output of the mark filter. That is, at the space frequency, much more energy is delivered by the space filter than at the mark frequency. Conversely, much less energy is presented by the space filter at the mark frequency and much more by the mark filter. The space signal is negatively rectified and the mark signal is positively rectified. These signals are shown as signals E and F respectively of FIG. 7. They are then summed in operational amplifier 323, its output being smoothed by filter 324 (identical to filter section 15a but for component values) with signal RCV representing a smoothed difference as shown in waveform G of FIG. 7. Comparator 325 and associated logic circuitry provides the RCVD signal, which is the actual data received as shown in waveform H of FIG. 7.

Signal RCV provides an input to carrier detect circuit 21 which also has signals CDT OFF and ENC-DTON— as inputs to enable (or disable) the carrier detect circuit. The timing of carrier detect is performed outside of the modem chip by placing a desired RC time constant signal at terminal TMG. If a carrier is present, output DCD will go high.

This detailed description of the circuit and its operation illustrates a novel FSK receiver. FSK transmitter and combination of the FSK receiver and FSK transmitter. It is contemplated that others may use analog filters of other designs, may use more than one integrated chip and vary widely in the values of components and in logic design without departing from the invention as described in the appended claims.

What is claimed is:

1. An integrated automatic gain control circuit for maintaining an alternating input signal at a predetermined amplitude, comprising:
   (a) switchable gain impedance means for receiving the input signal;
   (b) switched capacitor filter means incorporating the switchable gain impedance means, for providing a filtered output signal;
   (c) output signal comparison means for receiving and comparing the filtered output signal with the predetermined amplitude and for providing an UP signal if the filtered output signal is too small, and a DOWN signal if the filtered output signal is too large; and
   (d) switchable gain adjusting means receptive to the UP and DOWN signals connected to the switchable gain impedance means, for increasing or decreasing the impedance to increase the gain of the filter means in response to the UP signal if the filtered output signal is too small, and to decrease the gain of the filter means in response to a DOWN signal if the filtered output signal is too large.

2. The circuit of claim 1 wherein the switchable gain impedance means comprises a capacitor ladder network, including switches, wherein capacitors are selectively switched in and out of the circuit in response to the switchable gain adjusting means, to vary the impedance and to increase or decrease the gain of the filter means thereby.

3. The circuit of claim 2 wherein the filter means comprises a switched capacitor filter.

4. The circuit of claim 1 wherein the output signal comparison means comprises:
(c) (i) first and second voltage references;
(ii) a first comparison circuit for comparing the filtered output signal with the first reference voltage to change state if equality occurs, and for subsequently comparing the filtered output signal with the second voltage reference to change state if equality occurs;
(iii) a first latch circuit responsive to the comparator circuit, set when the comparator changes state because of the first voltage reference comparison,
(iv) a second latch circuit, responsive to the comparator circuit and to the first latch circuit, set when the comparator changes state because of the second voltage reference comparison; and
(v) a second comparator circuit for receiving the outputs of the first and second latch circuits and for providing the UP signal if the first latch circuit is set or the DOWN signal if the second latch circuit is set.

5. The circuit of claim 4 wherein the switchable gain impedance means comprises a capacitor ladder network comprising capacitor and switch steps, wherein capacitance may be switched in and out of the circuit to vary the impedance and to increase or decrease the gain of the filter means.

6. The circuit of claim 3 wherein the output signal comparison means comprises:
(c) (i) first and second voltage references;
(ii) a first comparison circuit for comparing the output signal with the first reference voltage to change state if equality occurs, and for subsequently comparing the output signal with the second voltage reference to change state if equality occurs;
(iii) a first latch circuit responsive to the comparator circuit, set when the comparator changes state because of the first voltage reference comparison,
(iv) a second latch circuit, responsive to the comparator circuit and to the first latch circuit, set when the comparator changes state because of the second voltage reference comparison; and
(v) a second comparator circuit for receiving the outputs of the first and second latch circuits and for providing the UP signal if the first latch circuit is set or the DOWN signal if the second latch circuit is set.

7. The circuit of claim 2 wherein the switchable gain adjusting means comprises:
(d) (i) a read-only memory for receiving the UP and DOWN signals and for providing counter signals in response thereto, and for providing control signals to the switchs of the capacitor ladder network; and
(ii) an up-down counter, responsive to the counter signals to count up or down in response thereto, providing outputs to the read-only memory for selecting the control signals.

8. The circuit of claim 6 wherein the switchable gain adjusting means comprises:
(d) (i) a read-only memory for receiving the UP and DOWN signals and for providing counter signals in response thereto, and for providing control signals to the switches of the capacitor ladder network; and
(ii) an up-down counter, responsive to the counter signals to count up or down in response thereto, providing outputs to the read-only memory for selecting the control signals.

9. The circuit of any of claims 1 through 8 wherein the circuitry is implemented in field effect transistors.

* * * * *